United States Patent [19]

Berglund et al.

[11] 4,298,927
[45] Nov. 3, 1981

[54] COMPUTER INSTRUCTION PREFETCH CIRCUIT

[75] Inventors: Neil C. Berglund, Kasson; William G. Kempke; William C. Richardson, both of Rochester, all of Minn.

[73] Assignee: International Business Machines Corporation, Armonk, N.Y.

[21] Appl. No.: 954,068

[22] Filed: Oct. 23, 1978

[51] Int. Cl.³ ............................................. G06F 9/22
[52] U.S. Cl. ................................................ 364/200
[58] Field of Search ........................... 364/200, 900

[56] References Cited

U.S. PATENT DOCUMENTS

| | | | |
|---|---|---|---|
| 3,162,841 | 12/1964 | Holleran | 364/200 |
| 3,293,616 | 12/1966 | Mullery et al. | 364/200 |
| 3,426,330 | 2/1969 | Marx et al. | 364/200 |
| 3,559,183 | 1/1971 | Sussenguth | 364/200 |
| 3,593,306 | 7/1971 | Toy | 364/200 |
| 3,766,527 | 10/1973 | Briley | 364/200 |
| 3,811,114 | 5/1974 | LaMay et al. | 364/200 |
| 3,886,523 | 5/1975 | Ferguson et al. | 364/200 |
| 3,956,738 | 5/1976 | Tessera | 364/200 |
| 3,972,024 | 7/1976 | Schroeder et al. | 364/200 |
| 4,004,281 | 1/1977 | Bennett et al. | 364/200 |
| 4,032,896 | 6/1977 | Bennett et al. | 364/200 |
| 4,040,030 | 8/1977 | Cassonnet | 364/200 |
| 4,050,058 | 9/1977 | Garlic | 364/200 |
| 4,062,058 | 12/1977 | Haynes | 364/200 |
| 4,079,455 | 3/1978 | Ozga | 364/200 |
| 4,084,227 | 4/1978 | Bennett et al. | 364/200 |
| 4,149,245 | 4/1979 | Gannon et al. | 364/200 |
| 4,179,737 | 12/1979 | Kim | 364/200 |

Primary Examiner—Errol A. Krass
Attorney, Agent, or Firm—Richards, Harris & Medlock

[57] ABSTRACT

A digital computer system including a computation unit (14), a main store (12), a virtual address translator (10), a microinstruction control unit (170) and an instruction code prefetch circuit (212). User instruction codes are stored sequentially in the main store (12) which is accessed for read and write operations by the virtual address translator (10). The instruction code prefetch circuit (212) retrieves the user instruction codes from the main store (12) and holds the instruction codes in a register (16, 18). The instruction codes are transferred from the register (16, 18) to the computation unit (14) in sequential order of use. The microinstruction control unit (170) produces selected microinstructions which are executed by the computation unit (14) to accomplish the operations specified by the user instructions. Designated microinstructions include commands which activate the instruction code prefetch circuit (212) to retrieve the succeeding user instruction codes from the main store (12).

29 Claims, 10 Drawing Figures

COMPUTER INSTRUCTION PREFETCH CIRCUIT

DESCRIPTION

1. Technical Field

This invention relates to digital computers and more particularly to a circuit for retrieving instruction codes from a main store in advance of the demand for the computer to use the instruction code.

2. Background Art

A high performance but low cost computer generally has a high speed microprocessor which utilizes a main store that cycles at a significantly slower speed than the microprocessor. In addition to the microprocessor, the main store must handle numerous independent requests from a number of input/output channels and, for a dynamic main store, refresh logic for maintaining the contents of main store. In order to have a large capacity main store at a reasonable cost, the cycle time is limited to being a relatively slow rate. The main store operates asynchronously with the microprocessor so a memory access request is returned by varying amounts of time after each request.

Computer systems which operate with the microprocessor accessing the main store at the time that the next user instruction is required wastes a substantial part of the microprocessor's time. This is due to the slow operation of the main store and the possible interference with main store requests from other sources. Often, numerous microprocessor cycles are missed during the time that the main store is processing a memory access request.

A need thus exists for a microprocessor prefetch circuit which can access the main store during a time of relatively light activity and extract the user instructions to be operated upon by the microprocessor in its succeeding cycles. In addition, there is a need for a buffer storage area to hold the instructions which have been retrieved from main store until they are utilized by the microprocessor.

DISCLOSURE OF THE INVENTION

The present invention comprises a prefetch logic circuit in a digital computer which accesses a main store having user instructions stored sequentially therein. The computer has a control store having a collection of microinstructions which are selectively called up by each instruction for execution by the computer. The prefetch logic circuit of the present invention retrieves the instruction codes from main store prior to use of the instructions by the computer. The prefetch logic comprises first and second registers which receive the instruction codes from the main store and holds them until they are input into the computer. An instruction address register maintains the address for the next instruction which is to be retrieved from main store and is incremented by the main store retrieval operations to update the address. Status latches are provided for each of the storage registers to indicate the validity of the instruction code stored in the register. The instructions in the first register are shifted into the second register which in turn supplies the instructions to the computer. A counter is provided to provide a count of the number of memory access operations which must be performed to fill the instruction registers.

Certain of the microinstructions generate a command to activate the prefetch logic and proceed to fill the instruction buffers as required. The prefetch logic executes the number of memory access operations as indicated by the counter and fills the instruction registers with the next sequential instructions by accessing the main store location indicated by the instruction address register.

Should a branch microinstruction be executed by the computer, the prefetch logic invalidates the instruction codes stored in the instruction registers and sets the counter to indicate that a plurality of main store access operations must be accomplished. This fill operation is initiated upon receipt of a fill command from a microinstruction. The branch instruction address is provided to the instruction address register and the upcoming instructions at the branch to location are transferred into the instruction registers for processing by the computer.

BRIEF DESCRIPTION OF DRAWINGS

A more complete understanding of the invention and its advantages will be apparent from the following Detailed Description taken in conjunction with the accompanying Drawings in which:

FIG. 11 is a chart showing representative microinstructions utilized to activate the prefetch circuitry of the present invention.

DETAILED DESCRIPTION OF THE DRAWINGS

Figure 1:
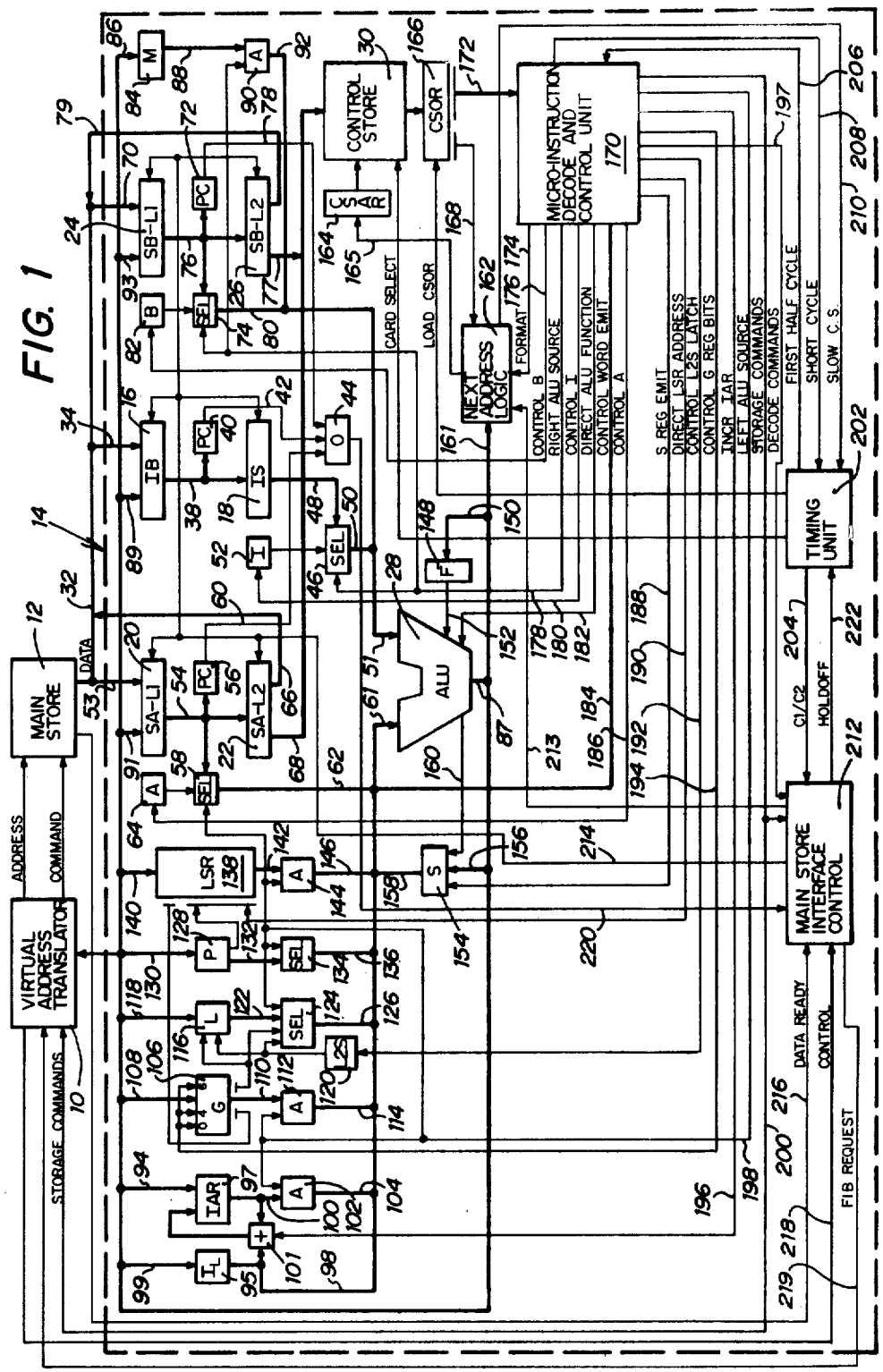
FIG. 1 is a generalized block diagram of a computer embodying the present invention.

Referring now to the drawings in which like reference characters designate like or corresponding parts throughout the several views, there is shown in FIG. 1 a diagram of a computer embodying the present invention. The computer shown in FIG. 1 includes a virtual address translator 10, a main store 12 and a computation unit 14 which comprises a microprocessor. Access to the main store 12 is substantially slower in operation than the computation unit 14 cycle period. Further, the main store 12 is of a dynamic design such that the main store must be periodically refreshed. Main store 12 operates asynchronously with microprocessor computation 14.

In normal operation, a computer operator provides high level instructions, sometimes referred to as macroinstructions, and other data such as operands to the main store 12. The high level instructions and operands are fetched from the main store in response to commands from the computation unit 14. The high level instructions are then executed in the computation unit. Commands or other data are transmitted from the microprocessor computation unit 14 to the main store 12 through the virtual address translator 10. The primary function of the virtual address translator 10 is to translate the virtual addresses received from the microprocessor computation unit 14 into real addresses usable for accessing data in the main store 12.

Execution of the high level instructions occurs in the computation unit in two phases commonly referred to as an I-phase and an E-phase. The I-phase occurs immediately prior to the E-phase. During the I-phase, the computation unit executes a plurality of microinstructions to prepare the computation unit for performing a mathematical or logical operation specified by the high level instruction. For instance, the high level instruction is decoded, if necessary, and operands are fetched from the main store 12 and transferred to the computation unit 14 in the I-phase of execution. During the E-phase, an arithmetic or logical operation is performed on the operands as specified by the high level instruction.

The computation unit 14 includes instruction buffer (IB) register 16 and instruction stream (IS) register 18 for receiving high level instructions. Instruction buffer (IB) register 16 receives the instructions and transfers them in a parallel shift to instruction stream (IS) register 18. Registers 20, 22, 24 and 26 receive operands from the main store 12. The registers 16, 18, 20, 22, 24 and 26 function as buffers temporarily holding information for subsequent use in the computation unit. Buffers are needed to permit faster operation of the microprocessor computation unit 14 relative to the main store 12. The operands are gated to an arithmetic logic unit 28 (hereinafter ALU 28) for the performance of an arithmetic or logical operation specified by the high level instruction. The execution of the high level instructions in the microprocessor computation unit 14 and the general operation of the microprocessor is primarily controlled by microinstructions stored in the control store 30.

It will be appreciated that FIG. 1 is somewhat diagrammatical and is intended to present an overview of the computer in order to aid a full understanding of the present invention. For clarity of illustration, certain communication paths are represented by heavy bold lines to indicate that these paths carry data directly corresponding to information received from the main store. Thus, the heavy bold lines may carry certain fields of data from the operands or the high level instructions or may carry the results of an arithmetic operation performed on the operands. The narrow light lines between the computer components represent control lines carrying signals that control the operation of the computation unit 14. Hereinafter, the heavy bold lines will be referred to as data paths, and the narrow light lines will be referred to as control lines. It will also be understood that single data paths and single control lines may indicate the presence of one or more actual conductor paths.

Referring now to the main store 12, a main data path 32 is connected to the main store and represents the data path through which information is transmitted to the computation unit 14. The IB register 16, a 36-bit (32 data bits and 4 parity bits) instruction register, receives high level instructions from the main store 12 through a data path 34. Data from IB register 16 is switched or transferred through data path 38 to IS register 18, which is also a 36-bit register. Registers 16 and 18 function to receive the high level instructions from the main store 12 prior to use by the ALU 28. The data output of the IB register 16 is also applied through the data path 38 to a parity check circuit 40 which detects any errors in the information received by the IB register 16. If a parity error is detected, circuit 40 applies an error signal through a control line 42 to an OR circuit 44. Operation of IB register 16 and IS register 18 is described in detail below.

The IS register 18 is connected to a selector 46 through a data path 48. In response to control signals, the selector 46 selects a field of data stored in the IS register 18 and shifts the data through a data path 50 to the right input 51 of the ALU 28. Since the ALU 28 can only process one or two bytes at a time, it is necessary to select a one or two byte field from the IS register 18 for processing in the ALU 28. The data field selected by the selector 46 is controlled by a two-bit instruction (I) pointer 52 that counts from zero to three. The output of the I-pointer 52 is applied to the selector 46 to specify and control which one or two of the four bytes in the IS register 18 will be selected and gated to the ALU 28 through the data path 50.

Since high level instructions may be two, four or six bytes in length, IS register 18 may not be large enough to contain the entire high level instruction. Thus, IB register 16 is provided to contain high level instructions for subsequent shifting into the IS register 18. The IS register 18 in combination with the IB register 16 appears to the remaining components of the microprocessor 14 to be an 8-byte register.

The SA-L1 register 20 and SA-L2 register 22 are shown in FIG. 1 to the left of the registers 16 and 18. The register 20 and 22 are both 36-bit (32 data bits and 4 parity bits) storage registers whose primary purpose is to buffer data such as operands from main store 12. Operands 12 are applied through data path 53 to the input of register 20. The output of register 20 is connected by a data path 54 to a parity check circuit 56, the storage buffer 22, and a selector 58. The parity check circuit 56 detects erroneous data in the storage register 20 and selectively applies an error signal through a control line 60 to the OR gate 44. The selector 58 is operable to gate one of four bytes of data stored in the register 20 to a left input 61 of the ALU 28 through a data path 62. The selector 58 functions in a manner similar to the selector 46, previously described. A two-bit A register 64 counts from zero to three to select which one of the four bytes stored in the register 20 will be gated to the left ALU input 61.

The data stored in the SA-L2 register 22 may be transferred to the main store 12 through a data path 66. Also, the data stored in register 22 may be applied through a data path 68 to the control store 30. In this configuration, microinstructions or other data may be stored in the main store 12 and transferred through the registers 20 and 22 to the control store 30. Thus, infrequently used microinstructions may be stored in main storage 12 and transferred to the control store 30 for occasional use in the microprocessor computation unit 14.

The SB-L1 register 24 and SB-L2 register 26 are located to the right of the instruction registers 16 and 18 in FIG. 1. Registers 24 and 26 are also 36-bit (32 data bits and 4 parity bits) registers and perform a function similar to the registers 20 and 22, respectively. Operands and data may be transferred from the main store 12 to the SB-L1 register 24 through a data path 70. The output of storage register 24 is connected to a parity check circuit 72, the storage register 26, and a selector 74 by a data path 76. The parity check circuit 72 is substantially similar to the parity check circuits 40 and 56. Parity check circuit 72 detects erroneous information in the register 24 and produces an error signal on control line 78 which is connected to an input of the OR gate 44.

The selector 74 functions in a manner similar to the selectors 46 and 58. The selector 74 selects one of four bytes of data stored in the SB-L1 storage register 24 and gates the selected byte to the right ALU input 51 through a data path 80. A two-bit B register 82 counts from zero to three with the output of the B register 82 connected to the selector 74 to determine which of the four bytes of data in the register 24 is gated to the ALU 28.

The SB-L2 register 26 is similar in function to the SA-L2 register 22. The output of the SB-L2 register 26 is applied through a data path 77 to the control store 30 and through a data path 79 to the main store 12.

An M register 84 is shown in FIG. 1 to the right of storage registers 24 and 26. M register 84 is a general purpose eight-bit work register having its input connected by data path 86 to the output 87 of the ALU 28. The output of the M register 84 is connected through a data path 88 to an AND circuit 90 that represents eight individual AND gates, one for each bit of the M register 84. The AND circuit 90 selectively gates the output of the M register 84 through a data path 92 to the right ALU input 51. Thus, the M register 84 may be used as both a source and a destination for the ALU 28. One use for the M register 84 is to store data necessary to calculate the address in the main store 12 of one end of an operand field.

The registers 16, 20 and 24 are also connected to the ALU output 87. IB register 16 may receive data from the ALU 28 through a data path 89, and data from the IB register is transferred to the right ALU input 51 through IS register 18 and selector 46. The SA-L1 register 20 selectively receives data from the ALU 28 through a data path 91 and may transfer data to the left ALU input 61 through the selector 58. Similarly, the SB-L1 register 24 selectively receives data from the ALU 28 through a data path 96 and transmits data to the right ALU input 51 through the selector 74.

Referring now to the left side of FIG. 1, there is shown an IL register 95 and an IAR register 97, each of which receives data from the output 87 of the ALU 28 through data paths 99 and 94, respectively. The IL register 95 is a three-bit register which contains the byte length of the high level instruction being executed in the microprocessor computation unit. The IAR register 97 normally contains data for calculating the address of the next high level instruction to be executed in the computation unit 14. The outputs of the IL register 95 and the IAR register 97 are selectively added in the summer 101, and the result is placed back in the IAR register 97. Also, the output of the IL register 95 may be applied to the left ALU input 61 through a data path 98, and the output of the IAR register 97 is applied through a data path 100 to an AND circuit 102. The AND circuit 102 actually represents sixteen separate AND gates for selectively applying the output of the IAR register 97 to the left ALU input 61 through a data path 104.

The G register 106 is a collection of special control latches used to control various operations of the computation unit 14. The zero bit of G register 106 determines when instructions are retryable should an error occur in the computation unit 14. Bits 4 and 6 of G register 106 are used as inputs to registers hereinafter described. The input of G register 106 is connected to the ALU output 87 by a data path 108, and the output of the register 106 is applied through a data path 110 to an AND circuit 112. The AND circuit 112 represents eight independent AND gates for selectively gating the data in the G register 106 through a data path 114 to the left ALU input 61.

An L register 116 is connected to the output 87 of the ALU 28 by a data path 118 and is normally used to store the length of operands to be used during the execution of a particular high level instruction. The L register 116 may be used as an eight-bit register or as two independent four-bit registers. When used as two registers, the L register 116 may store two operand lengths. Bit 6 of the G register 106 is used to determine whether the L register 116 will be used as an eight-bit or two four-bit registers. If bit 6 of the G register 106 specifies that the L register 116 is used as two four-bit registers, an L2S latch determines which of the two four-bit fields in the L register will be gated when the L register is selected as a source by a microinstruction. The output of the L register 116 is connected through a data path 122 to a selector 124. Selector 124 gates predetermined fields of the L register 116 through a data path 126 to the left ALU input 61.

A P register 128 is an eight-bit register connected to the ALU output 87 by a data path 130, and is primarily used to perform indirect addressing of a local storage array hereinafter described. The output of the P register 128 is applied through a data path 132 to a selector 134 that selects certain data fields from the P register and applies the data fields to the left ALU input 61 through a data path 136.

A local store array 138 consists of 128 bytes and is connected to the ALU output 87 through a data path 140. Each byte of the local store array 138 is individually addressable for reading and writing, and the addresses to the local store array 138 are generated directly in a manner hereinafter described or indirectly using the P register 128. The high order bit of the address to the array 138 is determined under certain conditions by bit 4 of the G register 106. The output of the local store array 138 is applied through a data path 142 to an AND circuit 144 that selectively applies data from the local store array 138 to the left ALU input 61 through a data path 146. Again, the AND circuit 144 represents a multiplicity of independent AND gates for gating data to the ALU 28.

The ALU 28 performs arithmetic or logical operations on data provided from the main store 12. The above described registers that have outputs connected to either of the ALU input 51 or input 61 may be selected as a data source for the ALU 28. Likewise, any register having an input connected to the ALU output 87 may be a destination of data from the ALU. Data from two registers are selected for processing through the ALU by the microinstructions of the computation unit 14. The ALU performs logical and binary arithmetic operations on bytes. The function of the ALU 28 may be specified directly in a microinstruction or indirectly by an F register 148 whose input is connected to the output of the ALU 28 by a data path 150. The F register 148 may control the operation of the ALU 28 through a signal applied to the ALU 28 through a control line 152.

In addition to performing arithmetic and logical operations, the ALU 28 may be used as a data path. To perform this function, data received on either ALU inputs 51 or 61 is passed through the ALU 28 to the ALU output 87. The ALU 28 is used as a data path to reduce cost by reducing the number of data paths necessary to achieve a selected capability or function.

An eight-bit S register 154 is connected to the output 87 of the ALU 28 through a data path 156, and the output of the S register is connected through a data path 158 to the left ALU input 61. The S register 154 contains ALU condition codes and temporary microprogram flags. ALU condition codes are applied to the S register 154 from the ALU 28 on control line 160. Bits 0-3 of the S register 154 are normally used for flags and bits 4-7 are normally used to contain the ALU condition codes. The microprogram can branch on each of the eight bits of the S register 154.

Next address logic 162 is connected through a data path 161 to the output 87 of the ALU 28. In response to data received from various parts of the computation unit 14, the next address logic 162 builds a next address code which will subsequently be used to select the microinstruction in the control store 30 to be executed following the execution of a presently executing microinstruction. The output data of the next address logic 162 is applied to a 32-bit control store address register 164 through control lines 165. The address loaded into the address register 164 selects a microinstruction stored in the control store 30 which is loaded into a control store output register 166. The output register 166 is also a 32-bit register, and each control word in the control store 30 is 32 bits in length. Separate or independent parts of the control store 30 operate at different speeds, thereby limiting the operating speed of the microprocessor computation unit 14 according to which part of the control store 30 is being used at a particular time. Also, as previously described, microinstructions may be transferred into the control store 30 from the main store 12 through the storage registers 22 and 26.

Certain fields of the control store output register 166 are applied to the next address logic 162 through control lines 168 and to a microinstruction decode and control unit 170 through a data path 172. The control unit 170 applies FORMAT signals to the next address logic 162 through the control lines 174. The FORMAT signals transfer data to the next address logic 162 indicating the type or format of the microinstruction presently being executed. The next address code loaded into the address register 164 is selectively built in the next address logic 162 from data received on control lines 168 and 174 and on the data path 160.

The control unit 170 applies a CONTROL B signal on control line 176 to increment the value in the B register 82 causing the selector 74 to select the next byte in the SB-L1 register 24. When the selector 74 receives a control signal to gate data, the selected byte in register 24 will be gated to the ALU 28. A RIGHT ALU SOURCE signal is produced on control lines 178 to gate data from a selected register to the right input of the ALU 28. The RIGHT ALU SOURCE signal wll activate either the AND circuit 90, the selector 74 or the selector 46 to gate either the data from the M register 84, the SB-L1 register 24 or the IS register 18, respectively, to the right input 51 of the ALU 28. It will be understood that only one register will be gated to the right ALU input 51 at any one time.

The control unit 170 generates a CONTROL I signal on control line 180 for incrementing the value in the I register 52. This incrementation causes the selector 46 to point to or select the next byte in the IS register 18 in the same manner as described in regard to B register 82. A DIRECT ALU FUNCTION signal is produced on control line 182 to determine the arithmetical logical function of the ALU 28. One function that may be chosen by the DIRECT ALU FUNCTION signal is that the ALU 28 performs the function specified in the F register 148. Thus, the DIRECT ALU FUNCTION signal may directly specify the function of the ALU 28 or indirectly specify the function through the F register 148. CONTROL WORD EMIT signals are produced on the data path 184 by the control unit 170 and are applied to the left ALU input 61. The ALU 28 passes the CONTROL WORD EMIT signals to the output 87 and loads the F register 148 through the data path 150. In this manner, the F register 148 is placed in condition by the control unit 70 for controlling the function of the ALU 28.

A CONTROL A signal is produced on a control line 186 by the control unit 170 for incrementing the value in the A register 64. In response to being incremented, the A register 28 causes the selector 58 to point to or select the next byte in the SA-L1 register 20. The selected byte will be gated to the left input 61 of the ALU 28 when the selector 58 is activated. On control lines 188, the control unit 170 produces an S REGISTER EMIT signal which loads bits 0-3 in the S register 154. DIRECT LSR ADDRESS signals are transmitted over control lines 190 to directly address the local store array 138. The CONTROL L2S LATCH signal produced on control line 192 is applied to the L2S latch 120 to control the state of the L2S latch.

CONTROL G REGISTER BIT signals are produced on control lines 194 by the control unit 170 to determine the state of bits 0, 4 and 6 of the G register 106. An INCREMENT IAR signal is produced on control line 196 which is applied to the summer 101, causing the data in the IL register 95 to be added to the data in the IAR register 97 and placing the result in the IAR register 97.

Control unit 170 produces a plurality of decode commands from the microinstructions and applies these commands over control line 197 to the main storage interface control 212.

The control unit 170 produces LEFT ALU SOURCE signals on control lines 198 to gate the data of one register to the left ALU input 61. As with the right ALU input 51, only one register may be gated to the left ALU input 61 at one time. The LEFT ALU SOURCE signals are applied to either the AND gates 102, 112, or 144 or the selectors 124, 134 or 58. In this configuration, the control unit 170 will gate data to the left input 61 of the ALU 28 from one of the following: the IA register 97, the G register 106, the L register 116, the P register 128, the local store array 138 or the SA-L1 register 20.

STORAGE COMMANDS are applied from the control unit 170 through control lines 200 to the virtual address translator 10 and interface control 212. Such STORAGE COMMANDS control the fetching of high level instructions, operands and other data from the main store 12 for use in the computation unit 14.

It will be appreciated that the operation of the computation unit 14 is primarily controlled by the microinstructions from control store 30 which are decoded in the microinstruction decode and control unit 170. This control unit 170 is a logic unit constituting an important part of the present invention and providing for inexpensive, efficient and flexible operation of the microprocessor computation unit 14. That portion of the microinstruction decode and control unit 170 that is pertinent to the present invention will hereinafter be described in greater detail in conjunction with the figures following FIG. 1.

A timing unit 202 generates a plurality of CLOCK signals which are transmitted over lines 204. The timing unit 202 also produces a FIRST HALF-CYCLE signal on control line 206 which is received by the control unit 170. In the execution of certain microinstructions, it may be desirable to use the same data path or control lines twice during the execution of a single microinstruction. The selected data path will be used for one function during the first half of the microinstruction execution cycle, and for a second purpose during the last half of the microinstruction execution cycle. The FIRST HALF-CYCLE signal indicates the end of the first half-cycle to the control unit 170 to facilitate the use of one data path or control line for two separate purposes or functions during one execution cycle.

A SHORT CYCLE signal is applied from the control unit 170 to the timing unit 202 through control line 208 to indicate that the particular microinstruction being executed has a short execution cycle relative to the execution cycle of microinstructions designated as normal. In response to the SHORT CYCLE signal, the timing unit 202 produces fewer timing clocks per execution cycle. The next address logic 162 applies a SLOW Control Store (SLOW C.S.) signal to the timing unit 202 on control line 210. This SLOW C.S. signal causes the timing unit to produce more timing clocks per execution cycle. It is necessary to produce this longer cycle when microinstructions are being fetched from a slow segment of control store 30. Two additional control signals generated by the timing unit 202 are a LOAD CSOR signal for sequencing the output register 166, and a CARD SELECT signal connected to the control store 30.

In response, to signals received from the control unit 170, the timing unit 202, the virtual address translator 10, and the main store 12, the main store interface control 212 controls the interface between the computation unit 14 and the main store 12. A microinstruction address command is generated by the main store interface control 212 on control line 213 to next address logic 162. LOAD signals are selectively produced on control lines 214 to cause the loading of data into the following: SA-L1 register 20, SA-L2 register 22, IB register 16, IS register 18, SB-L1 register 24 and SB-L2 register 26. It will be appreciated that only one of the registers 16, 20 or 24 should be loaded with data from the main store 12 at one time unless it is desired to load the same data into two or more registers. These registers 16, 20 and 24 share the same main data path 32 from the main store 12 to the computation unit 14. Likewise, only one of the registers 16, 20 and 24 should be loaded from the ALU output 87 at one time.

The main store interface control 212 receives storage commands from the control unit 170 on lines 200 and receives DATA READY signals from the main store 12 on the control lines 216. Control signals are received by the interface control 212 on line 218 from the virtual address translator 10, and a plurality of clock signals are received on control line 204. The DATA READY signal indicates to the interface control 212 that data is ready at the output of the main store 12 for transfer to the computation unit 14. A control signal on line 218 indicates whether the DATA READY is signalling the completion of a main store FETCH or STORE operation. If a fetch, another control signal on line 218 indicates which register SA, SB or IB is to receive the data. Another control signal on line 218 indicates that a translation has been completed in the virtual address translator 10 and a main store access is being initiated. Also, the control signals on lines 218 can indicate that a complete translation in the virtual address translator 10 cannot be accomplished. A FILL INSTRUCTION BUFFER REQUEST (FIB REQUEST) signal is generated by the interface control 212 to the virtual address translator 10 for loading IB register 16.

The main store interface control 212 are receives a MAIN STORE ERROR (MS ERROR) signal on control line 220 from the OR gate 44. A MAIN STORE ERROR signal is produced when erroneous or invalid data is detected by parity check circuit 56, 40 or 72. In response to the MAIN STORE ERROR signal, the interface control 212 will prevent the computation unit 14 from operating using the erroneous data. Finally, the main store interface control 212 produces a HOLDOFF signal on control line 222 which is connected to the timing unit 202. The HOLDOFF signal will cause the timing unit 202 to suspend the generation of clock timing signals necessary for microinstruction execution. The purpose of the HOLDOFF signal is to temporarily suspend the execution of a microinstruction under certain conditions.

Figure 2:
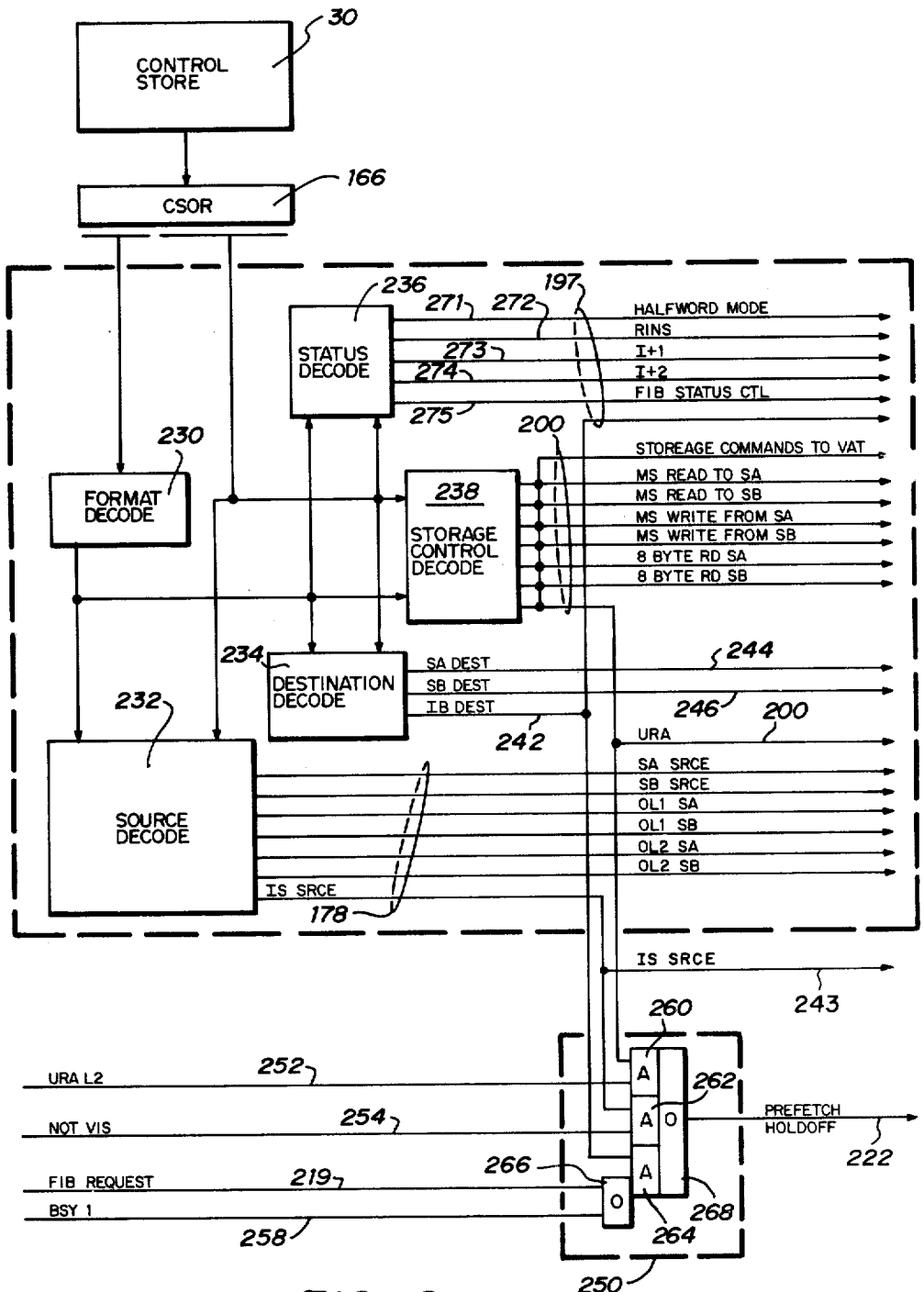
FIG. 2 is a block diagram of the control store and decoding circuitry and a part of the main store interface control shown in FIG. 1.

The microinstruction decode and control unit 170 is illustrated in greater detail in FIG. 2. The microinstruction stored in control store output register 166 is divided into two segments, the first segment being utilized by the format decode 230 and the second segment being input to a plurality of decode units. The units receiving the second segment include a source decode 232, a destination decode 234, a state decode 236 and a storage control decode 238.

The format decode transmits a format signal to the source decode 232, destination decode 234, status decode 236 and storage control decode 238.

Source decode 232 generates a plurality of commands on lines 178 for gating instructions or data from the respective registers 16, 20, 22, 24 and 26.

The destination decode circuit 234 generates a group of destination signals on line 242, 244 and 246 which activate, respectively, registers 16, 20 and 24 for receipt of data or instructions over the input lines thereto.

Storage control decode 238 generates a plurality of main store commands on control lines, designated generally as line 200 in FIG. 1. The commands specifically are main store read to SA (register 20), main store read to SB (register 24), main store write from SA (register 22), main store write from SB (register 26), 8-byte read SA (registers 20 and 22) and 8-byte read SB (registers 24 and 26). An UNRESOLVED ACCESS (URA) signal is generated by the storage control decode 238 on line 200 to indicate a main store read to IB register 16. Each of the commands generated by the storage control decode circuit 238 is supplied over line 200 as storage commands to the virtual address translator 10.

A prefetch holdoff circuit designated generally as 250 is a part of the main store interface control 212. The inputs to this circuit, which are generated by circuits described below, include UNRESOLVED ACCESS LATCH 2 (URA L2) on line 252, and NOT VALID IS Register (NOT VIS) latch signal on line 254. A signal for the FILL INSTRUCTION BUFFER REQUEST (FIB REQUEST) is transmitted on line 219 to the prefetch holdoff circuit 250. The final input is a main store BUSY LATCH 1 is signal (BSY 1) which is transmitted over line 258 to logic 250. The function of these signals is described below.

Prefetch holdoff circuit 250 includes an AND circuit 260 having as inputs the URA signal on line 200 and the URA L2 signal on line 252. A second AND circuit 262 has as a first input the INSTRUCTION STREAM REGISTER 18 SOURCE (IS SRCE) signal from within the group of command signals 178 and as a second input the NOT VIS signal on line 254. A third AND circuit 264 has as a first input the INSTRUCTION BUFFER REGISTER 16 DESTINATION (IB DEST) command on line 242 generated by destination decode 234 and has the output of an OR circuit 266 as the second input. OR circuit 266 is provided with the FIB REQUEST signal on line 219. The second input to OR circuit 266 is the main store BUSY LATCH 1 (BSY 1) signal on line 258. The outputs of each of the AND circuits 260, 262 and 264 are connected to one of the inputs of an OR circuits 268 which generates a PREFETCH HOLDOFF signal on line 222, this signal interrupting operation of the microprocessor 14 which is shown in FIG. 1. Operation of the computer in response to the PREFETCH HOLDOFF signal on line 22 is described in further detail below.

The status decode 236 generates a group of output signals when certain microinstructions are present in the control store output register 166. The signals generated by certain microinstructions are a HALFWORD MODE signal on line 271, RESET IN USE (RINS) signal on line 272, an INCREMENT BY ONE (I+1) signal on line 273, an INCREMENT BY TWO (I+2) signal on line 274 and a FILL INSTRUCTION BUFFER STATUS CONTROL (FIB STATUS CTL) signal on line 275. The IB DEST signal on line 242 is conveyed along with the signals on lines 271-275 in control line 197. The operations utilizing these signals will also be described below.

Figure 3:
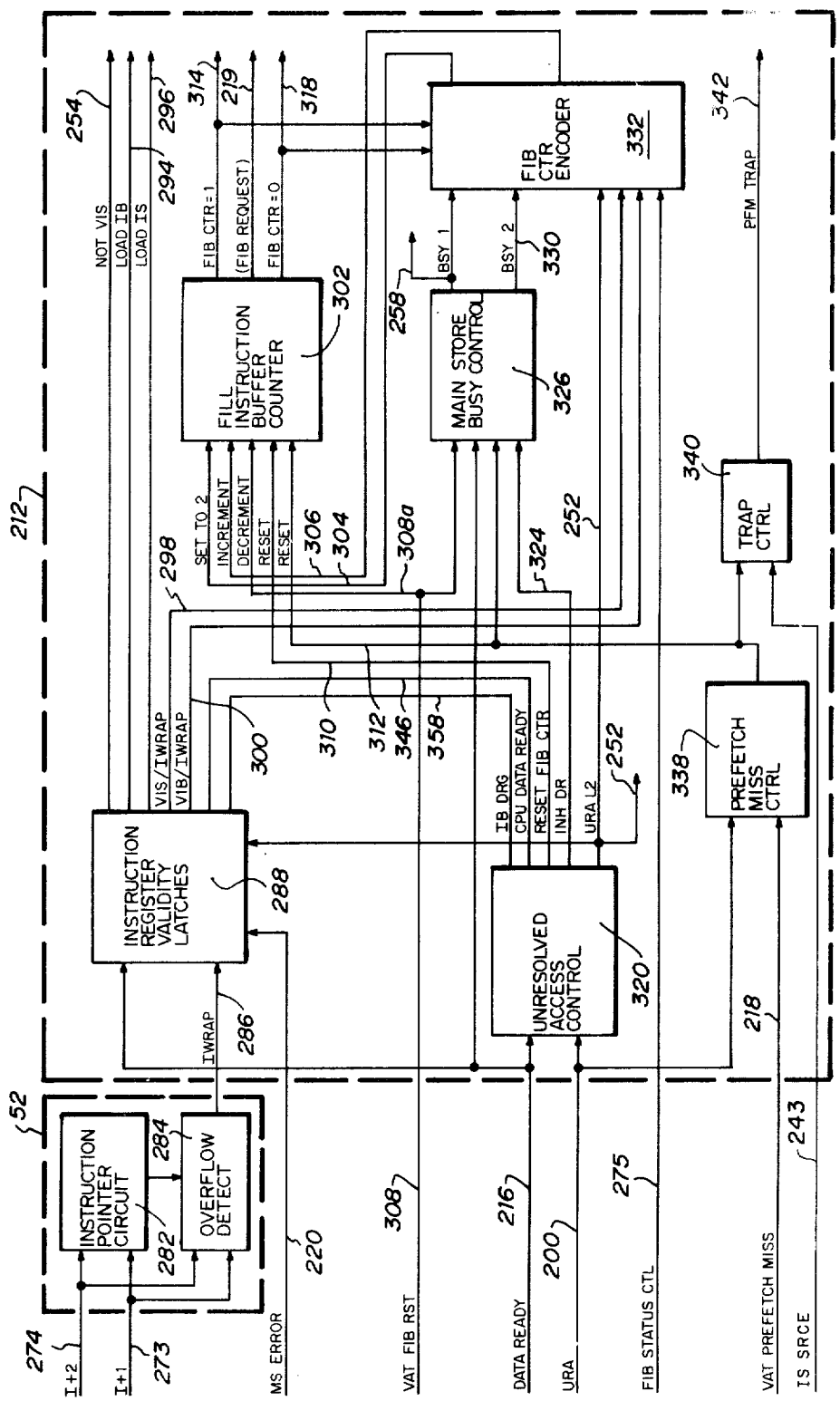
FIG. 3 is a block diagram of the prefetch circuitry in the main store interface control of the present invention.

A part of the prefetch circuitry of the present invention is illustrated in block diagram form in FIG. 3. This circuitry is included as a part of the main store interface control 212 shown in FIG. 1. This circuitry controls the operation of the IB and IS registers 16 and 18 so as to maintain a flow of instructions from the main store into the ALU 28 with a minimum delay despite the time required to access main store 12.

FIG. 3 includes an instruction pointer circuit 282 to indicate which of the four bytes of instruction stored in IS register 18 is next to be transferred to ALU 28. This pointer is incremented in two byte steps by the I+2 signal on line 274 which is generated by the status decode unit 236 on command of given microinstructions. Alternatively, certain of the microinstructions can generate I+1 signals on line 273 to increment pointer 282 in one byte steps. The instruction pointer 282 functions as a ring counter and cycles back to zero when it reaches its maximum state. An overflow detect circuit 284 monitors the instruction pointer 282 and generates an INSTRUCTION POINTER WRAP (IWRAP) signal whenever the instruction pointer transitions from its maximum value back to its minimum value. The IWRAP signal is generated on line 286. Circuits 282 and 284 together constitute the I-pointer 52 in FIG. 1.

For IB and IS registers 16 and 18, there is an associated validity latch which is set when the instruction in the respective register is valid and reset when the instruction is invalid. These latches are included in an instruction register validity latch circuit 288. A first input to this circuit is a MAIN STORE ERROR (MS ERROR) signal on line 220 from OR circuit 44. This signal is activated when a parity error (invalid data) has been detected in a main store transfer operation. A second input is the DATA READY signal on line 216 which is generated by the main store 12 after data has been retrieved and is ready for transfer to a receiving register. A third input is the IWRAP signal on line 286. The final input is a reset signal which is the URA L2 signal on line 252.

The instruction register validity latch circuit 288 generates as outputs the NOT VIS signal on line 254, a LOAD IB register 16 (LOAD IB) signal on line 294, a LOAD IS register 18 (LOAD IS) signal on line 296, and IS VALIDITY AND IWRAP signal (VIS/IWRAP) on line 298 and an IB VALIDITY and IWRAP signal (VIB/IWRAP) on line 300.

The prefetch logic of FIG. 3 also includes a fill instruction buffer counter 302 which indicates the number of main store commands that must be issued to fill the IB and IS registers 16 and 18. The first input to the counter 302 is a SET TO 2 command on line 304. This sets the counter to its maximum value of 2. An INCREMENT command is supplied on line 306 while a DECREMENT command is input on line 308a. The DECREMENT command on line 308a is a VIRTUAL ADDRESS TRANSLATOR FILL INSTRUCTION BUFFER RESET (VAT FIB RST) command on line 308 which is generated by the virtual address translator 10 shown in FIG. 1 when address translation requests have been successfully completed. Reset commands are supplied on lines 310 and 312 to set the state of the counter 302 to zero.

A first output of the fill instruction buffer counter 302 is a signal on line 214 which indicates that the FILL INSTRUCTION BUFFER COUNTER 302 EQUALS ONE (FIB CTR=ONE). A second output is the FILL INSTRUCTION BUFFER REQUEST (FIB REQUEST) on line 219 which is generated when the fill instruction buffer counter is not zero. The final output of counter 302 on line 318 is an indication that the FILL INSTRUCTION BUFFER COUNTER IS EQUAL TO ZERO (FIB CTR=ZERO).

The prefetch logic further includes an unresolved access control 320 to obtain correct instruction codes from main store 12 when a branch instruction is encountered in the user instruction stream being processed in IS register 18. The first input to the unresolved access control 320 is the UNRESOLVED ACCESS (URA) signal on line 200 supplied from the storage control decode circuit 238 shown in FIG. 2. The second input to the unresolved access control 320 is the DATA READY signal transmitted to line 216 from the main store 12 shown in FIG. 1. Unresolved access control 320 generates a RESET FILL INSTRUCTION BUFFER COUNTER (RESET FIB CTR) signal on line 310 which acts to reset the fill instruction buffer counter 302. A second output of the control 320 is an INHIBIT DATA READY (INH DR) signal on line 324. INH DR inhibits the DATA READY signal. The last output of unresolved access control 320 is the URA L2 signal on line 252 which provides a reset to the instruction register validity latches 288.

A further section of the prefetch logic as illustrated in FIG. 3 is termed the main store busy control 326. This circuit generates a pair of signals to indicate that the main store is in the process of fetching instruction codes from memory but has not yet supplied these codes to the instruction registers 16 and 18. The first input to main store busy control 326 is the FILL INSTRUCTION BUFFER RESET (FIB RESET) signal which is carried on line 308 and is generated by the virtual address translator 10. The second input to main store busy control 326 is the DATA READY signal provided over line 216 from the main store 12. A reset command is input to control 26 over line 312. The final input is the INH DR signal which is supplied through line 324.

The first output of main store busy control 326 is a FIRST MAIN STORE BUSY (BSY 1) signal which is conveyed over line 258. This signal indicates that the main store is processing a fetch to retrieve an instruction command. The second output of main store busy control 326 is a SECOND MAIN STORE BUSY (BSY 2) signal on line 330 which indicates that the main store is in the process of retrieving both first and second fetch requests.

Still referring to FIG. 3, the prefetch logic includes a fill instruction buffer counter encoder 332 which generates the command signals to drive the fill instruction buffer counter encoder 302. Both the BSY 1 and BSY 2 signals on lines 258 and 330, respectively, are input to the fill instruction buffer encoder 332. The VIS/IWRAP signal on line 298 and the VIB/IWRAP signal on line 300 are transmitted to encoder 332 as inputs thereof. Also provided as inputs are the URA L2 signal on line 252 and the FIB STATUS CTL command on line 275. Two of the outputs of the fill instruction buffer counter 302 are themselves provided as inputs to the fill instruction buffer counter encoder 332. These are the FIB CTR=ONE SIGNAL on line 314 and the FIB CTR=ZERO signal on line 318.

Two output signals are generated by the fill instruction buffer counter encoder 332. The first output signal is generated on line 304 to set the fill instruction buffer counter to a value of two (SET TO 2) which is the maximum value in this embodiment. The second output of the encoder 332 is a signal (INCREMENT) on line 306 which increments counter 302 by a unitary step upward.

A prefetch miss control 338 is also included in the prefetch logic control for handling the situation which arises when the virtual address translator 10 is unable to make a virtual to real translation of the requested address. Two input signals are supplied to the prefetch miss control 338. The first is the URA signal on line 200 from the storage control decode 238 and the second is the VIRTUAL ADDRESS TRANSLATOR PREFETCH MISS (VAT PREFETCH MISS) signal which is provided as one line over communication path 218 shown in FIG. 1. The output of control 338 is supplied as a reset signal to the fill instruction buffer counter 302 and the main store busy control 326.

Control 338 also provides an input to a trap control circuit 340. A second input is the IS SRCE signal from SOURCE DECODE unit 232 via line 243. The output of trap control circuit 340 is a PREFETCH MISS TRAP (PFM TRAP) signal on line 342. The trap signal on line 342 is conditioned to occur when the virtual address translator 10 is unable to provide the necessary real address to the main store. The trap signal on line 342 is generated when the microprocessor selects IS REGISTER 18 as a right ALU source while the signal from PREFETCH MISS CTRL 338 is active.

Figure 4:
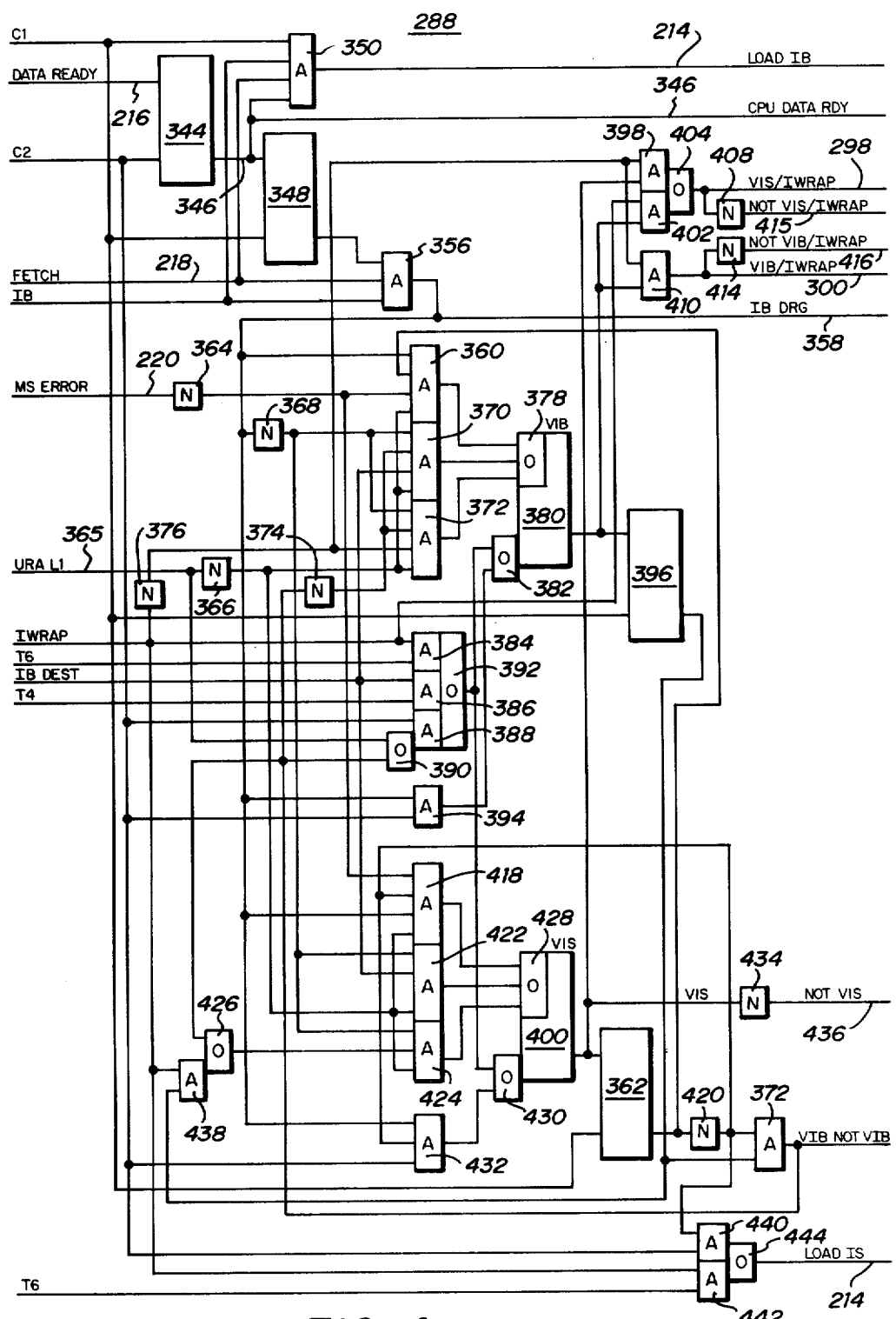
FIG. 4 is a logic diagram of the instruction register validity latches shown in FIG. 3.

The instruction register validity latch circuit 288 is illustrated in logic circuit form in FIG. 4. A number of clock inputs are provided to sequence the operation of the logic in the circuitry described herein. These clock signals are described below and carry the terminology C1, C2, TX, T2, T3, T4, T5 and T6. These clock signals are periodic and have a fixed relationship to each other.

The circuit shown in FIG. 4 provides the function of indicating the validity of the data held in each of instruction registers 16 and 18. The validity latch circuit 288 includes a latch 344 having the DATA READY signal on line 216 as the data input along with a C2 clock input.

Latch 344, as well as each of the latches described in this disclosure, provides the data logic level on the output line at the lower right side of the latch block at the time when the clock input line is activated. The output of latch 344 is termed the CPU DATA READY signal on line 346.

The CPU DATA READY signal is suplied to the data input of a latch 348 and as a first input to an AND circut 350. The second input to circuit 350 is a FETCH signal which is generated by the virtual address translator 10 and transmitted over line 218 in coincidence with DATA READY to indicate that a fetch operation has been completed. The third input to AND circuit 350 is an IB signal which is generated by the virtual address translator 10 and transmitted over line 218 in coincidence with DATA READY to indicate that the data on the memory bus 32 is to be loaded into IB Register 16. The fourth input is the C1 clock signal. The ANDing of the listed four signals in AND circuit 350 produces a LOAD IB (LOAD IB) signal on line 214 to activate register 16 for receiving instructions from the main store 12. This is one of a number of signals carried on line 214.

Connected to the output of the latch 348 is an AND circuit 356 which is provided with three inputs, the first being the output of latch 348. The remaining inputs are the FETCH signal on line 218 and the IB signal on line 242. The output of AND circuit 356 is an IB DATA READY GATE (IB DRG) signal on line 358.

Also tied to the output of the AND circuit 356 is an AND circuit 360 with the IB DRG signal on line 358 as a first input and the output of a latch 362 as the second input. The MAIN STORE ERROR (MS ERROR) signal on line 229 is passed through an inverter circuit 364 and provided as the third input to AND circuit 360. The UNRESOLVED ACCESS LATCH 1 (URA L1) signal on line 365 is passed through an inverter 366 to provide the fourth input to AND circuit 360.

The IB DRG signal on line 358 is passed through an inverter 368 to provide the first input to an AND circuit 370. The second input to circuit 370 is the output of an AND circuit 372 after it has been passed through an inverter 374. The third input to AND circuit 370 is the IB DEST signal on line 242 from the destination decode 234. The fourth input to AND circuit 370 is the inverse of URA L1, the signal on line 364.

The first input to AND circuit 374 is the inverse of the IB DRG signal on line 358 from the inverter 368. A second input to AND circuit 374 is the inverted output of AND gate 372 and the third input is the inverse of the INSTRUCTION POINTER WRAP (IWRAP) signal which is transmitted from line 286 through an inverter 376. The fourth and final input to AND gate 374 is the inverse of the URA L1 signal on line 365.

The outputs of each of the AND circuits 360, 370 and 374 constitute the three inputs to an OR circuit 378 which generates the data input to the instruction buffer register 16 validity latch 380. The clock signal for latch 380 is provided by OR circuit 382. A true output from latch 380 indicates that the instructions in instruction buffer register 16 are valid while a false output indicates that the instructions are not valid and cannot be used by the ALU 28.

A further element of the prefetch register validity latch circuit 288 is an AND circuit 384 having the IWRAP signal on line 286 as the first input thereto. The second input is the clock signal T6.

AND circuit 386 has the IB DEST signal on line 242 as the first input and clock signal T4 as the second input.

AND circuit 388 has clock C2 as the first input with the output of OR circuit 390 as the second input. OR gate 390 receives the URA L1 signal on line 365 and the output of AND circuit 372 to produce the second input to AND circuit 388.

The outputs of each of the AND circuits 384, 386 and 388 are connected to OR circuit 392 to produce a signal which is supplied as the first input to OR circuit 382.

AND circuit 394 has input thereto the IB DRG signal on line 358 and clock C2 to produce the second input to OR gate 382.

The instruction buffer register 16 validity signal generated by latch 380 is provided as the data input to latch 396 which is activated by clock C1.

Referring further to FIG. 4, AND circuit 398 has the inverse of IWRAP from line 286 (NOT IWRAP) provided as the first input with the output of instruction stream register 18 validity latch 400 connected to the second input. AND circuit 402 has the IWRAP signal on line 286 as the first input thereto and the output of latch 380 as the second input.

The ANDed outputs of circuits 398 and 402 are directed to OR circuit 404 to produce a VALIDITY INSTRUCTION STREAM/IWRAP (VIS/IWRAP) signal on line 248. A signal representing the inverse of VIS/IWRAP (NOT VIS/IWRAP) is produced by passing the VIS/IWRAP signal from line 298 through an inverter 408.

AND circuit 410 has NOT IWRAP connected as the first input with the second input being the output of latch 380. The output of AND gate 410 is VALIDITY INSTRUCTION BUFFER/IWRAP (VIB/IWRAP) signal on line 300. The signal on line 300 is passed through inverter 414 to produce the inverse of VIB/IWRAP (NOT VIB/IWRAP) signal on line 416.

The VIB/IWRAP signal and VIS/IWRAP signal anticipate the validity status for each of the instruction registers 16 and 18, respectively, after the next instruction transfer is made from the instruction stream register 18 into the ALU 28.

A still further element of the prefetch buffer validity latch circuit 288 is an AND circuit 418 having the inverse of MS ERROR signal on line 220 provided as the first input. The second input is the output of latch 362 after it has been passed through an inverter 420. A third input to AND circuit 418 is the IB DRG signal on line 358, while the final input is the inverse of the URA L1 signal on line 365.

AND circuit 422, adjacent to AND circuit 418, has the inverse of the IB DRG signal on line 358 as the first input thereto. The second input is the IB DEST signal on line 242 with the final input being the inverse of the URA L1 signal on line 365.

The AND circuit 424 is the third in the group with circuits 418 and 422 and has as a first input the inverse of the IB DRG signal on line 358, the second input being the output of an OR circuit 426 and the third input being the inverse of the URA L1 signal on line 365.

The outputs of each of the AND circuits 418, 422 and 424 are provided as the three inputs to an OR circuit 428 which generates the data signal input to the data validity latch 400 for the IS register 18. This latch is clocked by the output of an OR gate 430 having as inputs the output of OR gate 392 and the output of an AND gate 432. A true signal produced by latch 400 indicates that the instructions in the IS register 18 are valid and can be used by the ALU 28, and a false output from this latch indicates that the instructions therein are not valid and cannot be used. The signal produced by latch 400 is termed the VALIDITY IS register (VIS) signal and the inverse (NOT VIS) of this signal is produced by passing VIS through an inverter 434. The inverse signal NOT VIS is produced on line 436.

Connected to an AND gate 438 is the IWRAP signal on line 286 and the output of latch 396 to produce the second input to OR gate 426. The output of AND circuit 372 provides the first input to OR circuit 426. The output of latch 396 is also provided as the second input to AND gate 372.

A further logic group in the prefetch buffer validity circuit shown in FIG. 4 consists of AND circuits 440 and 442 which provide inputs to OR circuit 444. The first input to AND circuit 440 is the inverted output of latch 362, while the first input to AND circuit 442 is the IWRAP signal on line 286. AND circuit 440 is driven by clock signal C2 while AND circuit 442 is driven by clock T6. OR circuit 444 produces a LOAD IS signal (LOAD IS) on line 214. When this signal is generated, the instructions in the IB register 16 are shifted into the IS register 18.

Figure 5:
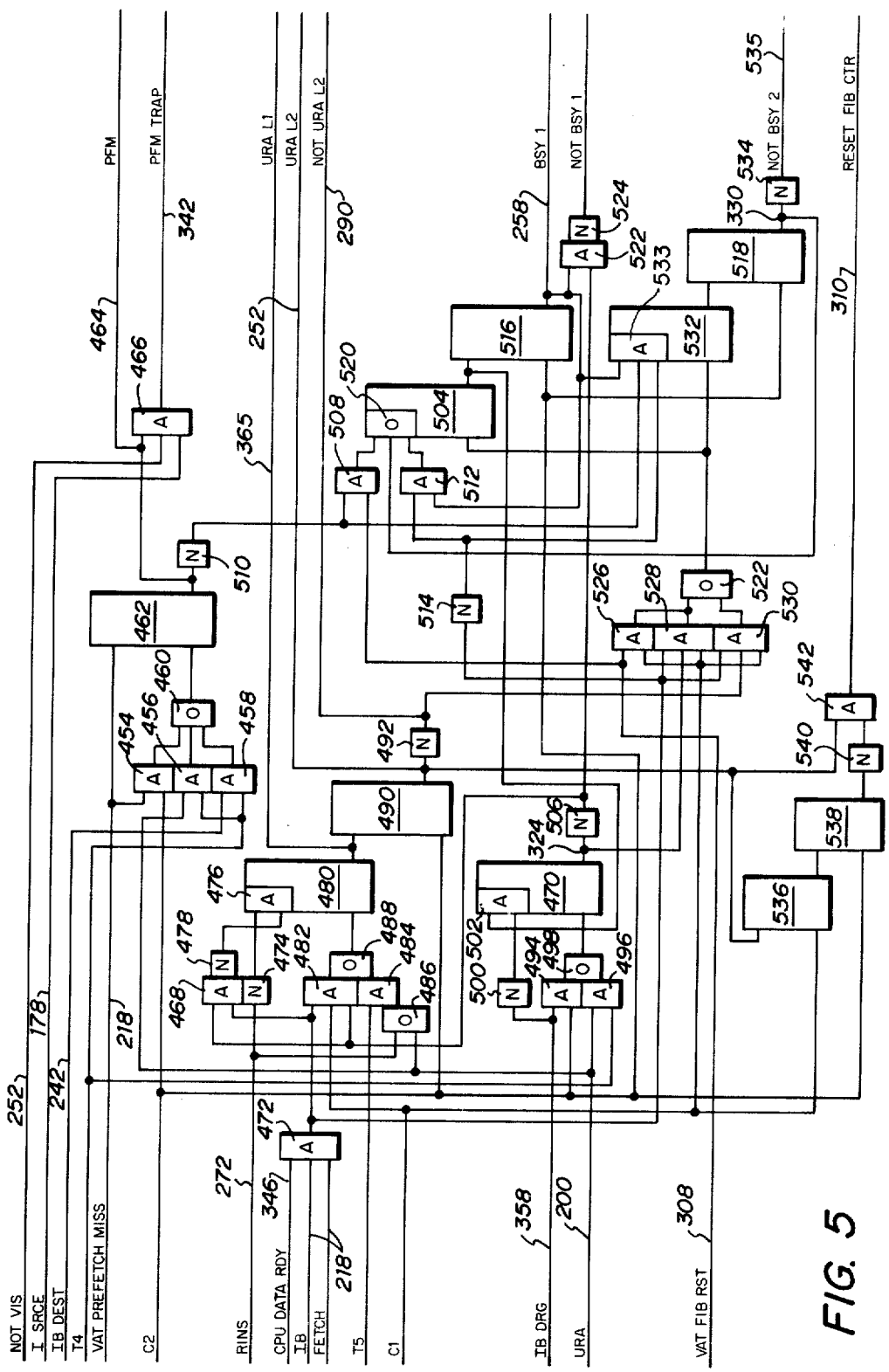
FIG. 5 is a logic diagram of a number of the functional blocks shown in FIG. 3 including the unresolved access control, main store busy control, prefetch trap control and prefetch miss control.

Referring now to FIG. 5, there is shown additional logic circuitry representing functional elements illustrated in FIG. 3. These include the fill instruction buffer counter 302, unresolved access control circuit 320, main store busy control 326, prefetch miss control 338 and prefetch trap control 340.

A group of AND circuits 454, 456 and 458 in the top center of FIG. 5 each provide an input to an OR circuit 460 which generates the clock signal for latch 462. The VAT PREFETCH MISS signal on line 218 is provided as a first input to AND circuit 454 and as the data input to latch 462. Clock C2 provides the second input to AND circuit 454. The URA signal on line 200 from the storage control decode 238 is the first input to AND circuit 456. Clock T4 provides a second input to circuit 456 as well as a first input to AND circuit 458. The remaining input to AND circuit 458 is the IB DEST signal on line 242.

Latch 462 generates a PREFETCH MISS (PFM) signal on line 464 which constitutes a first input to an AND circuit 466. The second input to AND circuit 466 is the NOT VIS signal while the third input is the IS source command generated by the source decode 232 on line 178. AND circuit 466 generates a PREFETCH MISS TRAP (PFM TRAP) signal on line 342 as shown in FIG. 3.

The circuitry that produces the URA L1 and URA L2 signals includes an AND circuit 468 having as a first input the inverted output of the INH DR signal on line 324 generated by a latch 470. The second input to AND circuit 468 is the output of an AND circuit 472. The signals provided to AND circuit 472 are CPU DATA READY signal on line 346, the IB signal on line 218 and the FETCH signal also on line 218.

The RINS signal on line 272 is passed through an inverter 474 to the first input of an AND circuit 476. The output of AND circuit 468 is passed through an inverter 478 to provide the second input to AND circuit 476, which generates the data input to an unresolved access latch 480.

AND gate 482 receives the output signal of AND gate 472 as the first input and the inverted output of latch 470 as the second input thereto. Clock C1 provides the third input to AND circuit 482.

Clock T5 is input to an AND gate 484 along with the output of OR gate 486. OR gate 486 is driven by the RINS signal on line 272 and the URA signal on line 200.

OR circuit 488 is provided with the outputs of AND circuits 482 and 484 to generate the clock driver for unresolved access latch 480. When the output of this latch is in the true state, a main store fetch to IS REGISTER 18 via IB REGISTER 16 has been initiated by a microinstruction from control store 30. This indicates that the sequentially derived instructions in IB and IS registers 16 and 18 are invalid since the user branch instruction will require instructions other than those which were produced sequentially.

A second unresolved access latch 490 is provided with the output of unresolved access latch 480 as the data input and is driven by clock C2. Latch 490 produces the URA L2 signal on line 252. The inverse of this signal is produced by passing the output of latch 490 through an inverter 492 to produce NOT URA L2 signal on line 290. URA L2 is the URA L1 signal delayed and is used to prevent race hazards in the logic circuitry.

Still referring to FIG. 5, the IB DRG signal on line 358 and the C2 clock are provided as inputs to AND circuit 494. The URA signal on line 200 and clock T4 are provided as inputs to an AND circuit 496. The outputs of AND circuits 494 and 496 are provided to OR circuit 498 which in turn generates the clock input to latch 470.

The IB DRG signal on line 358 is passed through inverter 500 to provide a first input to AND circuit 502. The second input to circuit 502 is provided by latch 504. Latch 470 generates the INHIBIT DATA READY (INH DR) signal on line 324 which causes the prefetch logic to ignore DATA READY signals from the main store when a user branch instruction has been encountered in IS Register 18, since the instructions being pre-fetched to IB Register 16 are those in the sequential order rather than the instructions at the branch to location in main store. The output of latch 470 is passed through an inverter circuit 506 to provide inputs to AND circuits 468 and 482.

Referring to the right central protion of FIG. 5, generation of the main store busy signals BSY 1 and BSY 2 will be described. The VAT FIB RST signal on line 308 is provided as a first input to an AND circuit 508 with the second input being the output of prefetch miss latch 462 after it is passed through an inverter 510. AND gate 512 has input thereto the output of inverter 514 which has the input thereof connected to receive the output of AND circuit 472. The second input to circuit 512 is the output of latch 516. The outputs of circuits 508 and 512 are provided along with the output of a latch 518 as inputs to an OR circuit 520 which generates the data input to latch 504. The clock input to latch 504 is generated by OR circuit 522.

Latch 516 receives the clocked output of latch 504 along with clock C2 to produce main store BUSY 1 (BSY 1) signal on line 258.

AND circuit 522 receives the BSY 1 signal on line 258 along with the inverted output of latch 470. The output of AND circuit 522 is inverted to produce the inverse main store busy 1 signal (NOT BSY 1) on line 524.

Referring now to the central portion of FIG. 5 to the logic which generates the main store BUSY 2 (BSY 2) signal, AND circuit 526 receives the VAT FIB RST signal on line 308 as a first input and clock C2 as a second input. AND circuit 528 receives the output of AND circuit 472, the output of latch 470 and clock C1. The remaining AND circuit 530 in this group has as input thereto the output of AND circuit 472, the inverted output of latch 490 and clock C1. Each of the outputs of AND circuits 526, 528 and 530 are transferred to OR circuit 522 to produce the clock input for main store busy 2 latch 532.

The data input of latch 532 is provided by AND circuit 533. AND circuit 533 has as first input the output of latch 516. A second input is the inverted output of latch 462. A third input is the output of inverter 514.

Latch 518 receives the output of main store busy latch 532 and clock C2 to generate BSY 2 signal on line 330 which is transferred through inverter 534 to produce the inverted BSY 2 signal (NOT BSY 2) on line 535.

Still referring to FIG. 5, latch 536 receives at its data terminal the output of latch 490 and at its clock terminal the clock C1. Latch 538 receives the output of latch 536 as well as clock C2 and transfers its output through inverter 540 to a first input of AND circuit 542. A second input is provided to AND circuit 542 from the output of latch 490. AND circuit 542 generates the RESET FIB CTR signal on line 310 as shown in FIG. 3.

Figure 6:
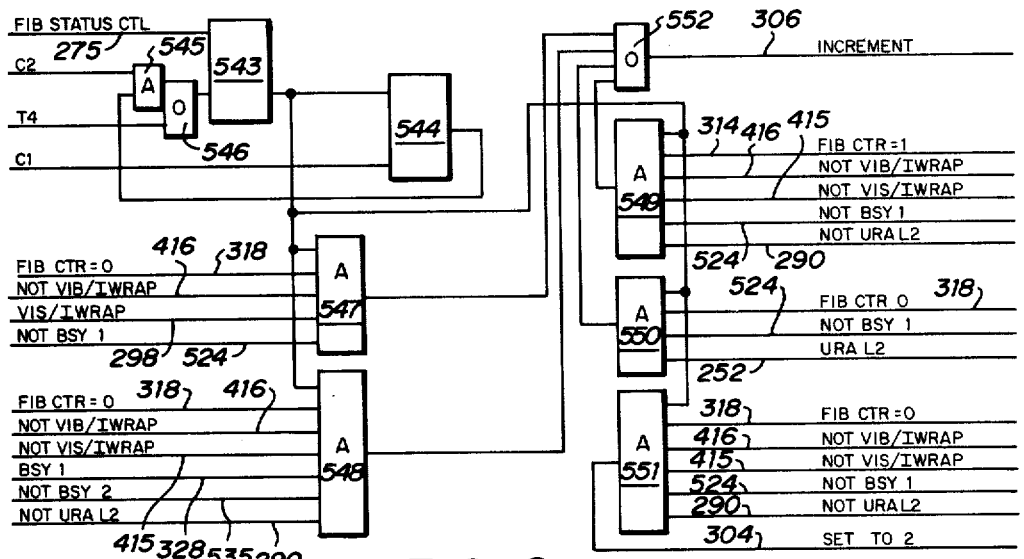
FIG. 6 is a logic diagram of the fill instruction buffer counter shown in FIG. 3.

The fill instruction buffer counter 302 in FIG. 3 is shown in detail logic circuit form in FIG. 6. The FIB STATUS signal on line 275 is connected to the data input of a latch 543 which provides the output signal thereof to the data input of a latch 544. Latch 544 is clocked by clock C1. An AND circuit 545 receives the output of latch 544 and the C2 clock. OR circuit 546 receives the output of AND circuit 545 along with the T4 clock. The output of latch 543 is provided as a first input to AND circuits 547, 548, 549, 550 and 551.

The remaining inputs to AND circuit 547 are the FIB CTR EQUAL ZERO signal on line 318, NOT VIB/IWRAP on line 416, VIS/IWRAP on line 298 and NOT BSY 1 on line 524.

AND circuit 548 receives the FIB CTR EQUAL ZERO signal on line 318, NOT VIB/IWRAP signal on line 416, NOT VIS/IWRAP signal on line 415, BSY 1 signal on line 258, NOT BSY 2 signal on line 535 and NOT URA L2 signal on line 290.

AND circuit 549 has input the FIB CTR EQUAL ONE signal on line 314, NOT VIB/IWRAP on line 416, NOT VIS/IWRAP on line 415, NOT BSY 1 on line 524 and NOT URA L2 on line 290.

Still referring to FIG. 6, AND circuit 550 has input thereto the FIB CTR EQUAL ZERO signal on line 318, NOT BSY 1 signal on line 524 and the URA L2 signal on line 252.

The final AND circuit 551 in FIG. 6 receives the FIB CTR EQUAL ZERO signal on line 318, NOT VIB/I-WRAP on line 416, NOT VIS/IWRAP on line 415, NOT BSY 1 on line 524 and NOT URA L2 on line 290. Circuit 551 generates the SET TO 2 signal on line 304 which is input to the fill instruction buffer counter 302.

The outputs of each of the AND circuits 547, 548, 549 and 550 is supplied to an OR circuit 552 to produce the INCREMENT signal on line 306, this signal being supplied to the fill instruction buffer counter 302.

Figure 7:
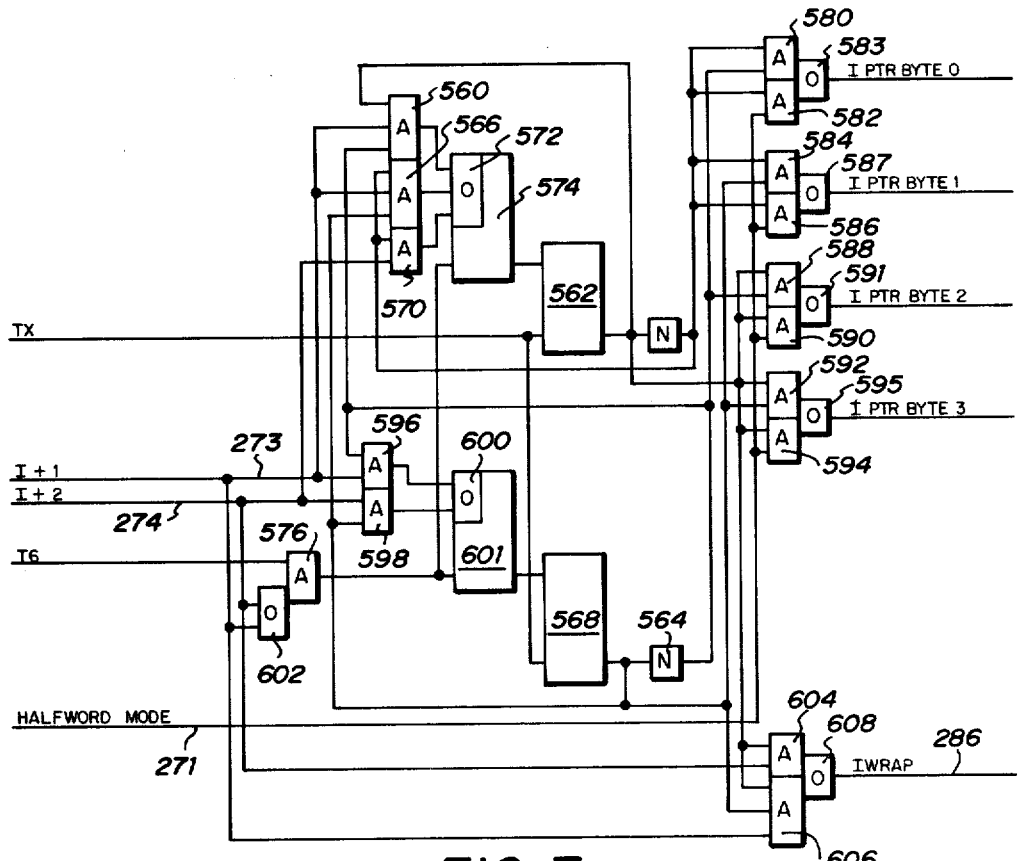
FIG. 7 is a logic diagram of the instruction pointer 282 and overflow detect circuit 284 shown in FIG. 3.

Instruction pointer circuit 282 and overflow detect circuit 284 shown in FIG. 3 are illustrated in logic circuit form in FIG. 7. The I+1 signal on line 273 is applied as a first input to an AND gate 560. A second input is the output of latch 562 and a third input is the output of inverter circuit 564. A second AND circuit 566 also has input thereto the I+1 signal on line 273 along with the inverted output of latch 562. A third input to circuit 566 is the output of a latch 568. The AND circuit 570 in the group with circuits 560 and 566 has the inverted output of latch 562 as the first input and the I+2 signal on line 274 as the second input thereto.

AND circuits 560, 566 and 570 provide the inputs to an OR circuit 572 which generates the data input to latch 574. The clock input to latch 574 is provided by an AND gate 576.

The data input to latch 562 is provided by latch 574. Latch 562 is also provided with a TX clock input. An inverter 578 receives the output of latch 562 for transfer to other circuit elements.

The inverse output of latch 562 is provided as an input to AND gates 580, 582, 584 and 586. The noninverted output of latch 562 is provided as a first input to AND circuits 588, 590, 592 and 594.

AND circuits 580 and 588 receive the inverted output of latch 568 as the second input thereto. AND circuits 584 and 592 receive the noninverted output of latch 568 thereto. AND gates 582, 586, 590 and 594 receive a HALFWORD MODE command on line 271 from the status decode 236.

AND circuits 580 and 582 generate the inputs to an OR circuit 583 which activates the I pointer for byte 0 in the IS register 18. AND circuits 584 and 586 drive OR circuit 587 to direct the I pointer to byte 1 in the IS register. AND circuits 588 and 590 provide inputs to OR circuit 591 to direct the I pointer to byte 2 in the IS register. Likewise, AND circuits 592 and 594 provide the outputs thereof to OR circuit 595 to direct the I pointer to byte 3 in the IS register 18.

The I+1 signal on line 273 is provided as an input to AND circuit 596 along with the inverted output of latch 568. AND circuit 598 receives the I+2 signal on line 274 along with the noninverted output of latch 568.

AND circuits 596 and 598 provide the inputs to an OR circuit 600 which generates the data signal for latch 601. Both the I+1 and I+2 signals on lines 273 and 274 are provided to an OR circuit 602 which serves as one input to the AND circuit 576. Clock signal T6 is provided as the second input to AND circuit 576. The output of AND circuit 576 provides the clock signal for latch 574 as well as latch 601.

Latch 568 receives the output of latch 601 at its data terminal and clock signal TX at its clock input.

The overflow detect circuit 284 shown in FIG. 3 comprises AND circuits 604 and 606, and OR circuit 608. AND circuit 604 receives inputs from the output of latch 562 and the I+2 signal on line 274. AND circuit 606 receives inputs from the output of latch 562, latch 568 and the I+1 signal on line 273. Circuits 604 and 606 provide the inputs to the OR circuit 608 which generates the IWRAP signal on line 286. Activation of this signal indicates that the instructions in the IS register 18 have all been transferred to the ALU 28.

Figure 8:
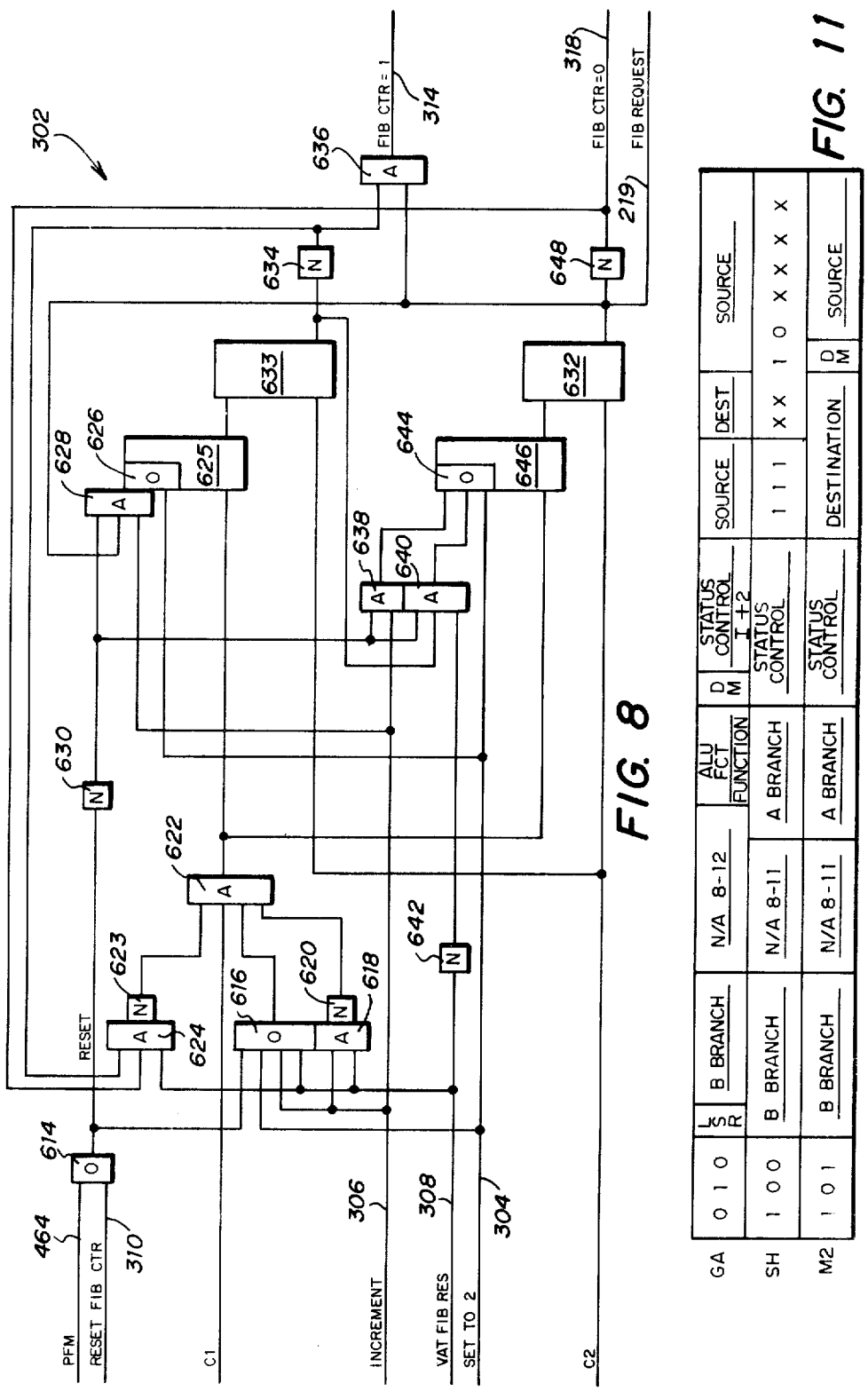
FIG. 8 is a logic diagram of the fill instruction buffer counter shown in FIG. 3.

The fill instruction buffer counter 302 shown in FIG. 3 is illustrated in detail in FIG. 8. The PREFETCH MISS signal on line 464 from FIG. 5 and the RESET FIB CTR signal on line 310 are provided as inputs to an OR circuit 614 which generates a RESET signal at the output thereof.

The RESET signal from OR circuit 614 is provided as a first input to an OR circuit 616. A second input is the SET TO 2 signal on line 304. The remaining inputs to circuit 616 are the INCREMENT signal on line 306 and the VAT FIB RST signal on line 308.

AND circuit 618 has input thereto the INCREMENT signal on line 306 and the VAT FIB RST signal on line 308. The output of AND circuit 618 is passed through an inverter 620 and supplied as a first input to an AND circuit 622. Other inputs to AND circuit 622 are the output of OR circuit 616, clock C1 and the output of inverter 523 which receives the output of AND circuit 624. AND circuit 624 has as inputs the inverted output of latch 623, the inverted output of latch 632 and the VAT FIB RES signal on line 308.

The output of AND circuit 622 is provided to the clock terminal of latch 625. The data input to latch 625 is provided by an OR circuit 626 which has input thereto the SET TO 2 signal on line 304 and the output of an AND gate 628. AND gate 628 has input thereto the output of OR gate 614 which has been passed through an inverter 630, the output of a latch 632 and the INCREMENT signal on line 306. The output of latch 625 provides the data input to latch 633 which also receives the clock C2 input.

Latch 633 generates an output which is transferred through an inverter 634 and supplied as the first input to an AND gate 636. The second input to AND gate 636 is provided by the noninverted output of latch 632. Circuit 636 generates the FIB CTR=1 signal on line 314.

The INCREMENT signal on line 306 along with the output of inverter 630 are provided as inputs to an AND circuit 638. Adjacent to the AND circuit 638 is an AND circuit 640 that is also provided with the output of inverter 630 as well as the output of latch 633 and the VAT FIB RST signal on line 308 after it has been passed through an inverter 642.

The outputs of AND circuits 638 and 640 are provided as inputs to OR circuit 644 along with the SET TO 2 signal on line 304. OR gate 644 generates the data signal for latch 646 which has the output of AND circuit 622 as the clock driver. The output of latch 646 provides the data input into latch 632 which is clocked by clock signal C2.

The output of latch 632 is passed through inverter 648 to generate the FIB CTR=0 signal on line 318. The noninverted output of latch 632 is the FIB REQUEST signal on line 219, this signal indicating that the counter 302 is set to a value other than zero and a request to fill the IB register 16 should be made.

Figure 9:
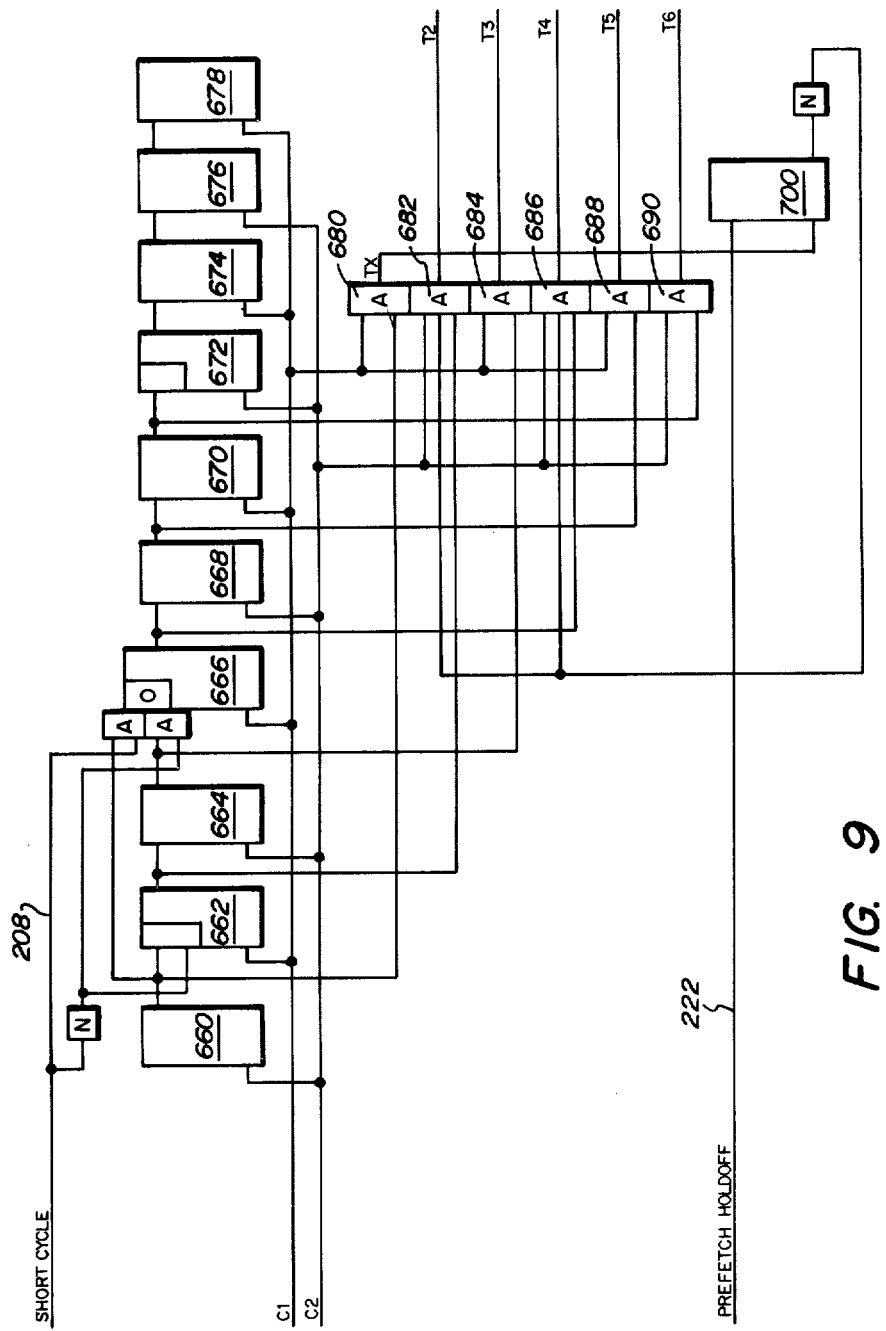
FIG. 9 is a logic diagram of the timing circuit that generates the various clock signals used throughout the computer.
Figure 10:
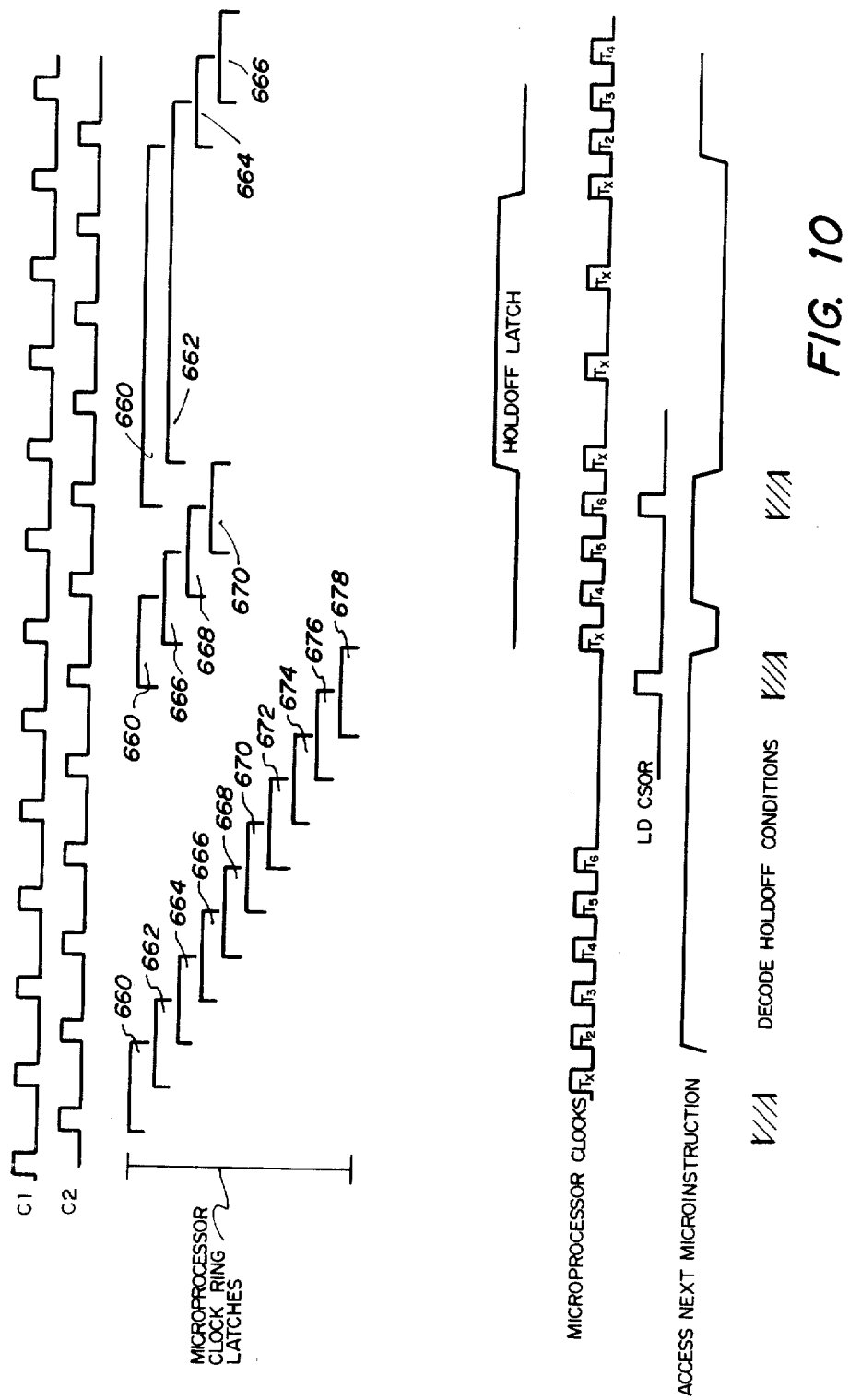
FIG. 10 is a timing diagram illustrating the clock signals generated by the circuit shown in FIG. 9.

The various clock signals generated for use in the circuitry of the present invention are provided by the logic circuit illustrated in FIG. 9. The system operates on basic clock signals C1 and C2 which are shown at the top of FIG. 10. The oscillator which generates clocks C1 and C2 is not shown. These clocks operate at the same rate but are 180 degrees out of phase.

The clock signals C1 and C2 are provided to a series of ring latches to generate subclock periods that are in turn used to generate specific clock pulses during microprocessor cycles. As shown in FIG. 9, the clock signals C1 and C2 are input in various combinations to the latches 660, 662, 664, 668, 670, 672, 674, 676 and 678. These latches as shown generate the respective clock signals illustrated in FIG. 10 with the clock number corresponding to the number of the latch which produces the clock signal. These clock signals are provided to a series of AND gates 680, 682, 684, 686, 688 and 690 to generate the respective clock signals TX, T2, T3, T4, T5 and T6. These clock signals are also illustrated in FIG. 10.

At the lower portion of FIG. 9, a latch 700 has the data input connected to receive the PREFETCH HOLDOFF signal on line 222 input thereto which signal is derived from the logic at 250 in FIG. 2. Latch 700 has clock signal TX provided to clock terminal thereof.

The PREFETCH HOLDOFF signal on line 222 is generated when the microprocessor 14 has operated to the point that no further steps can be taken until a main store 12 fetch is completed. PREFETCH HOLDOFF signal on line 222 disables the clock circuit shown in FIG. 9 until a main store fetch is completed. After the fetch, the clock generation resumes and the microprocessor 14 continues operation.

Operation of the prefetch logic of the present invention is now described in reference to FIG. 1. Main store 12 provides a bulk memory storage for use by the microprocessor computation unit 14. However, due to economic restraints, the main store 12 operates at a much slower speed than the computation unit 14. In addition, the main store is accessed by other systems in addition to the computation unit 14. And, since the main store is generally a dynamic memory, a provision must be made to refresh the contents of memory periodically. The peripheral devices and refresh logic utilize a portion of the main store time and reduce access to the main store by the computation unit 14. However, in order for the microprocessor computation unit 14 to function, it must have the high level instructions and operands which are deposited in the main store. Should the microprocessor stop its operation when each request is made to main store and await the return of the data thus requested, a substantial amount of time would be wasted thereby making the computer system operate inefficiently.

The objective of the present invention, instruction prefetch, is to retrieve the high level instructions from main store in advance of the requirement to use them by the microprocesor computation unit 14. The retrieval can be so timed as to utilize the main store when access is not required by the microprocessor. The instructions thus obtained are stored in high speed registers 16 and 18 which transfer the instructions to the ALU 28 upon demand. The transfer of instructions from the registers to ALU 28 is many times faster than a main store access. Therefore, if the registers 16 and 18 can be maintained full with upcoming instructions and the instructions can be fetched from memory without inhibiting microprocessor operations, the overall operation of the microprocessor system can be made substantially faster and more efficient.

Referring to FIGS. 1 and 2, the prefetch logic of the present invention is activated by selected microinstructions as these instructions are being executed in the control store output register 166. A substantial number of microinstructions are stored in the control store 30 to carry out the operations specified by the high level instructions provided by the user through the main store 12. A sample of the microinstructions which are used in the present computer are illustrated in FIG. 11. These microinstructions are 32 bits long and are divided into fields which accomplish specific purposes. The GA instructions, for example, carries out a general arithmetic operation. This instruction includes a branch condition in bit locations four through seven and a next address field in bit locations eight through twelve. The function of ALU 28 is specified in bit positions 13 through 15. A status control field in bit location 17 through 20 includes command codes for activating the prefetch logic of the present invention. If certain bits are set in the status control field, the prefetch logic is activated and begins the process of retrieving the upcoming instructions to be executed by the microprocessor from main store.

The remaining fields in the microinstructions specify the source of operands in positions 21 through 23 and 26 through 31 as well as the result destination in fields 24 and 25.

Similar status control fields are shown in the SH and M2 microinstructions in bit locations 16 through 20.

For each of these microinstructions having a status control field, the microcode programmer can select which of the microcodes will initiate the fetch logic to load the instruction buffers. The particular codes which include this status control operation are those which initiate the prefetch logic and the related memory access at a time when the main store is not being utilized by the microprocessor to fetch instruction operand into SA-L1 Register 20 or SB-L1 Register 24. This is primarily during the execution phase for each high level instruction. Thus, the times of activation of the prefetch logic are selectable by the microprogrammer through use of the status control bits set in the microcode instructions.

Referring to FIG. 1, the overall operation of the prefetch logic of the present invention is as follows. When certain microinstructions are present in the control store output register 166, a FIB STATUS CTL signal is generated by the status decode unit 236 on line 275, which is included in the group of control lines designated as decode commands 197. The FIB STATUS CTL signal is transferred to the main store interface control 212 and to the prefetch logic therein shown generally in FIG. 3. The prefetch logic examines various conditions within the microprocessor 14 and if these conditions are met and IB register 16 is empty, a FIB REQUEST signal is sent on line 219 to the virtual address translator 10. Upon receipt of a FIB REQUEST signal, the virtual address translator 10 examines an internal instruction address register (not shown) to determine the virtual address of the next sequential instruction to be utilized by the microprocessor 14. This virtual address is then referenced to a translation table to produce the real address which is transferred to the main store 12. The virtual address translator 10 then initiates a fetch command from the main store 12 to produce the next instruction. When the virtual address translator 10 has made a successful translation from virtual to real address, a reset command is sent to the main store interface control over line 218 to the prefetch logic to indicate that a fetch is in progress. The virtual address translator 10 also activates other signals on the control line 218 to indicate that the operation in progress is a fetch and that the data will be supplied to the IB register 16.

When the main store 12 has completed the retrieval of the instruction requested by virtual address translator 10, the instruction will be placed in its output buffer (not shown) for transfer over bus 32. When this instruction is in the output buffer, the data ready signal will be placed on line 216 to inform the prefetch logic that the instruction requested is ready for transfer.

Upon receipt of the data ready signal the prefetch logic examines the FETCH and IB signals from the virtual address translator 10 and an IB LOAD signal is sent over line 214 to transfer the instruction in the output register of main store 12 into the IB register 16.

Operation of the IS register 18 is described in reference to FIG. 1. The instructions stored in the IB register 16 are transferred in a parallel shift to the IS register 18 to produce a rapid transfer. IS register 18 in this embodiment has a length of four bytes but the ALU 28 can receive only one or two bytes for each operation. The selection of which bytes to transfer to the ALU 28 is accomplished by the I-pointer 52 and selector 46. The I-pointer operates the selector 46 to selectively gate one or two of the bytes of instruction stored in IS register 18 into the ALU 28.

Referring to FIGS. 3 and 7 there is shown the I-pointer circuit 282 and overflow detect circuit 284 in greater detail. The I+1 and I+2 signals on lines 273 and 274 are generated by the status decode 236 in response to the microinstructions. As the microinstructions from control store 30 decode and process the user instructions in IS Register 18, they simultaneously advance the I-pointer so that the next references to IS Register 18 by microinstructions will provide either additional bytes of the present user instruction or the next user instruction to be executed. The instruction pointer circuit 282 is in effect a four bit counter which is incremented by either one or two steps by the I+1 or I+2 signals on line 273 and 274. As the I-pointer is incremented, various ones of the OR circuits 583, 587, 591 or 595 are activated to select the appropriate bytes from IS register 18. When operating in a halfword mode the line 271 is activated in response to a particular microinstruction command so that two bytes are activated at each particular time for transfer to the ALU 28.

The overflow detect circuit 284 monitors the stepping of the instruction pointer and at the point of transition from the maximum to minimum value, for example in this embodiment from 3 to 0, the overflow detect circuit generates the IWRAP signal on line 286 to indicate that the instructions in the IS register 18 have been transferred to the ALU 28 and the register is now empty. The IWRAP signal also functions to cause the instruction stored in IB register 16 to be immediately transferred to IS register 18.

Referring now to FIGS. 3 and 4 for a description of the operation of the IB and IS validity latches, for the IB and IS registers 16 and 18 there is associated therewith a latch and a resulting signal to indicate the validity of the data stored within the register. In FIG. 4 the validity for IB register 16 is indicated by the output of latch 380 and the validity for IS register 18 is indicated by the output of latch 400. In general when the output of the latch is high, the instruction in the respective register is valid. But when the data level is low, the instruction is invalid and cannot be used by the microprocessor. The appropriate validity latch is set when error free data is loaded from the main store bus 32. The data is always loaded in IB Register 16 and latch 380 is set if the data is error free. If latch 400 is reset when the data arrives from main store, the data is passed to IS Register 18 via IB Register 16. Latch 400 is set to indicate valid data and latch 380 remains reset to indicate another fetch is required.

For IS register 18, the instructions therein are invalidated when the instructions have once been read to the ALU 28 and new instructions have not been received from the IB register 16. This is evidenced by the IWRAP signal which indicates that the pointer has completed its sweep across the instruction field. Therefore, each IWRAP signal sets the validity latch for the IS register 18 to be invalid until fresh instructions are received. If latch 380 is set when the IWRAP signal occurs, latch 400 will remain set but latch 380 will reset indicating an immediate tranfer of the contents of IB register 16 to IS register 18. If latch 380 is reset when the IWRAP signal occurs, latch 400 will reset until such time as new instructions arrive and are loaded in IS Register 18 via IB Register 16. The instructions in the IS register 18 are also made invalid when a branch instruction is encountered which requires that nonsequential instructions be utilized as the next steps in the user program. This is signaled to the prefetch logic via the microinstruction which initiates an UNRESOLVED ACCESS (URA) to IB Register 16.

Instructions in the IB register 16 are likewise set to be invalid after the instructions therein have been transferred to the IS register 18. A main store error on line 220 sets the validity latch for IB register 16 to be invaid when a main store transfer encounters a parity error as detected by parity check circuit 40. The instructions stored in register 16 are likewise invalidated when a branch instruction is encountered in the user instructions in IS Register 18 and the branch requires that non-sequential instructions be utilized. This is signaled to the prefetch logic via the microinstruction that initiates an UNRESOLVED ACCESS (URA) to IB Register 16.

Referring to FIGS. 3 and 5, there is shown the main store busy control 326. This control monitors the operation of the main store 12 in fetching instructions for transfer to the IB Register 16. Control 326 generates a BSY 1 signal on line 258 to indicate that the main store 12 is in the process of retrieving four bytes of instruction for transfer to the IB register 16. The control circuit also generates a signal BSY 2 on line 330 to indicate that two fetch requests are in progress to retrieve two blocks of instructions that will be input into IB register 16 for transfer to IS register 18.

When a FIB REQUEST has been initiated by the prefetch logic of FIG. 3 to the virtual address translator 10, a FIB RESET command on line 308 is sent from the virtual address translator to the main store busy control 326. The main store 12 generates a data ready command which is provided to the main store busy control 326 on line 216 when an instruction is in its output buffer and is ready to be transferred to the IB register 16. The control 326 counts the numbers and timing of the signals received on these two lines to determine the number of outstanding fetch requests which are being processed by the main store 12.

The fill instruction buffer counter 302 is described in reference to FIGS. 3 and 8. This counter produces control signals to indicate the state of the counter which indicates the number of instruction requests needed to be sent to the virtual address translator 10. Counter 302 has three output states, these states being 0, 1 and 2. The 0 state indicates that all outstanding requests have been translated by the virtual address translator 10. The main store fetch may not be complete, however, and this will be indicated by the busy controls 326. When a microinstruction generates a FIB STATUS CTL command on line 275 through the status decode unit 236, the counter 302 is set by FIB CTR ENCODER logic 332 to indicate the number of main store fetches required to fill IB Register 16 and IS Register 18 with valid data. The FIB CTR ENCODER determines the number of fetches required by examining the present value in the counter 302, the status of the busy latches 326, and the status of the validity latches 288.

When the validity latch for the IB register 16 is set to invalid and the validity latch for the IS register 18 is set valid and the counter 302 is in the zero state and the busy latches 326 are both reset, the fill instruction buffer counter 302 is incremented from zero to one to indicate that one memory instruction fetch is necessary to fill the instruction registers. This also causes the FIB REQUEST signal on line 219 to be activated and cause a memory fetch to be initiated to retrieve the next sequential instruction.

If both the validity latches 380 and 400 are reset and busy latch 1 516 is set and the present value of counter 302 is one, the FIB CTR ENCODE 332 produces no signal since two fetches are already requested. One fetch is in process in main store as indicated by busy latch 1 516 and one is in process in the virtual address translator 10 as indicated by the value 1 in counter 302.

Thus, in general the prefetch logic of FIG. 3 determines at all times the number of memory fetches which are necessary to fill the instruction registers 16 and 18. However, a fetch command is not sent over line 219 unless such a command is generated by the microinstruction code through the status decode unit 236. Further, if no instruction memory fetches are necessary, the commands generated by the decode unit requesting a memory access will be ignored.

Each time a FIB REQUEST command is sent from the fill instruction buffer counter 302 to the virtual address translator 10, the virtual address translator will access the main store, if the address is available, and will return to the prefetch logic with a FIB RESET signal on line 308 to indicate that a fetch is in progress. This signal also acts to decrement the fill instruction buffer counter 302 by one unit to cause the counter to indicate the actual number of outstanding requests still needed. If the counter 302 has not been set to zero, another FIB REQUEST will be sent and a second FIB RESET will be received from the virtual address translator 10. However, if after the first FIB RESET command is received from the virtual address translator 10 the counter 302 is set to zero, no further FIB REQUEST will be sent.

At the time that the FIB RESET signal is received by the main store busy control 326 in FIG. 3, the BSY 1 signal is set. When the data ready signal on line 216 is received by control 326, the BSY 1 signal is reset. However, if a second FIB RESET is sent before the BSY 1 is reset, the BSY 2 will be set to indicate that there are two outstanding memory fetch requests which are in process but have not been completed. Thus, as can be seen by the above description the prefetch logic generates memory fetch commands to maintain the IB and IS registers 16 and 18 filled to facilitate rapid processing of the instructions by the microprocessor 14 without causing detrimental interference with the normal operation of the microprocessor and eliminating the need for the microprocessor to stop its operations to await a memory fetch.

In the normal sequence of events, the fetches to IB register 16 come from sequential locations in main store 12. The address locations for the fetches are determined by an incrementing counter contained within the virtual address translator 10. However, the sequential flow of instructions is interrupted when a user instruction specifies a branch operation which causes the instruction stream to jump to a new instruction address location. When this situation occurs, the instructions which have previously been fetched and stored in the IB and IS registers 16 and 18 are no longer valid since they were derived for sequential operation.

When a branch condition occurs, the instruction registers 16 and 18 must be filled with the instructions at the branch to address in order for processing to continue. The branch condition is indicated by the generation of the URA (unresolved access) signal on line 200. This signal is produced by the storage control decode unit 238 in response to certain coding within the microinstructions which are decoding and executing the user branch instruction.

The URA signal on line 200 is transferred to the unresolved access control 320 as shown in FIGS. 3 and 5. A first effect of the URA signal is to generate the RESET FIB CTR signal on line 310 which sets the fill instruction buffer counter 302 to zero thereby removing the fill instruction buffer requests which have not yet been processed by virtual address translator 10. The URA signal on line 200 also sets a latch to generate the URA L1 signal on line 365. This signal acts to reset each of the validity latches 380 and 400 in FIG. 4 to indicate that the instructions in the IB and IS registers 16 and 18 are invalid. If busy latch 504 is active when the URA signal is encountered, latch 470 is set to generate the INH DR (inhibit data ready) signal on line 324 to cause the main store busy control 326 and the URA control 320 to ignore the next data ready signal generated by the main store 12. This data ready signal must be ignored since a fetch request that was in process by the main store 12 at the time the URA signal was encountered was based on the original sequential instruction cycle and is not usable with the branch instruction that has been encountered. Only one fetch can be in process in main store at this time because the counter 302 was immediately reset to remove the FIB REQUEST signal as described above.

Once the above conditions have been set up by the URA signal, the prefetch logic of FIG. 3 is set to initiate two memory access commands to retrieve instructions to fill the IB and IS registers 16 and 18. These fetch operations are initiated when a FIB STATUS CTL command is generated on line 275 in response to coding within a microinstruction contained within the control store output register 166. The microinstructions which include branch operations will also include commands in the control field to initiate the prefetch logic so that the next instructions required are provided.

The branch to address of the branch instruction is included within the branch instruction in IS Register 18. The address is transmitted from the IS Register 18 through ALU 28 on bus 87 to the virtual address translator 10 to set the address register within the translator to the address of the next instruction. The instruction register then increments from this point on until another branch instruction is encountered.

As described above, the virtual address translator 10 receives virtual addresses and by means of a table converts these to real addresses for accessing instructions from main store 12. The translation table is maintained therein for rapid access to certain segments of the main store memory. However, only a small section of the entire memory is accessible with the translation tables which can be stored within the virtual address translator 10. The translation table is normally maintained at such a size so that the primary user program in the main store can be referenced by means of the table. In the usual case a fetch instruction from the prefetch logic will be translated to obtain the desired instruction, but if the translation is not included within the table, the virtual address translator 10 is unable to retrieve the desired instruction. This can occur in a number of situations including passing over a page boundary of the table by the incrementing of the address register or by the input of a virtual address due to a branch instruction which selects an address that is not included within the translation table.

When the virtual address translator 10 is unable to make a translation of a virtual to a real address for a FIB REQUEST command on line 219, the translator responds to the main store interface control with a VAT PREFETCH MISS command on line 218. This indicates to the prefetch logic that the main store fetch to retrieve an instruction for the IB register 16 cannot be completed. This does not necessarily suspend operations of the microprocessor 14 since the instruction being requested is for use in the future and present operations with the instructions in IS register 18 can continue.

No action will be taken by the prefetch logic on the missed translation until the instructions contained within the IS register 18 have been completely exhausted. If an instruction within this register requires a branch operation then the contents of IB register 16 are not required and the URA signal on line 200 will reset the VAT PREFETCH MISS latch 462 and the branch operation will be conducted as described above. This operation ignores the missed translation in the virtual address translator 10 because the translation which was requested will no longer be used due to the branch operation.

However, if the IS register 18 does not contain a branch instruction and its contents have been exhausted, the validity latch for the IS register 18 will be reset to indicate that the contents of this register are invalid. The next time that a microinstruction references the IS register 18 for another instruction to continue the processing of the user program, a hardware trap operation will occur.

The hardware trap circuitry is illustrated in the upper section of FIG. 5. Latch 462 is set by the VAT PREFETCH MISS command which is generated by the virtual address translator when a translation cannot be accomplished. This latch provides a first input to an AND circuit 466. Circuit 466 generates the PFM TRAP signal when both the validity of the IS register as indicated by the NOT VIS signal on line 252 is high and the IS SRCE signal on line 178 indicates that the microinstruction is seeking access to IS register 18. The PFM TRAP signal generated by the AND circuit 466 causes a microprogram in the control store 30 to be called up. This program references a master table stored in main memory to obtain the proper translation for the virtual address which could not previously be translated by the virtual address translator. This program updates the virtual address translator registers so as to enable a translation to be made. After this translation update is made, normal operation of the computer is resumed as described above.

The operation as described above for obtaining the translation for a memory request which is not included within the translation table of virtual address translator 10 is particularly significant since prefetch misses do not slow microprocessor operation unless the instruction which was requested is actually going to be executed by the microprocessor. In many cases the instruction which causes the translation miss will not actually be used because a branch will be taken by the currently executing user instruction. In this latter situation, there will be no time wasted in obtaining the translation which will not be used. Thus, unnecessary translations are not made, and the operational performance of the microprocessor is not degraded.

In the situation where the validity latches for the IB and IS registers 16 and 18 are reset indicating that the instructions therein are invalid, a trap as described above will occur only when the PFM latch 462 is set, indicating that the virtual address translator 10 is unable to make a translation. If there is no translation failure, then the microprocessor has executed instructions faster than instructions can be fetched from the main store 12. In this case, the attempt by the microprocessor to fetch the next instruction from the IS register 18 must be blocked since the instruction therein is invalid. This is accomplished by the prefetch hold-off circuit 250 shown in FIG. 2. A PREFETCH HOLD-OFF signal is generated on line 222 when the above conditions are met. This signal is input to the clock network shown in FIG. 9. The PREFETCH HOLDOFF signal causes the generation of the microprocessor clocks for the ALU 28 and control store 30 to cease. The memory fetch operations being carried out by the main store 12 and virtual address translator 10 continue and, when an instruction transfer has been made to fill the IS register 18, the PREFETCH HOLDOFF signal on line 222 is removed and clock generation by the clock network shown in FIG. 9 is resumed and processor operation continues.

The clock network shown in FIG. 9 generates a plurality of clocks as shown in FIG. 10. The prefetch logic operates with a high speed clock while the microprocessor cycles on the basis of a clock which is counted down from the higher speed clock. Operation of the prefetch logic is not suspended when the PREFETCH HOLDOFF signal is set on line 222. The operation of the prefetch logic continues at a high speed in the operation of accessing the main store 12 and retrieving an instruction to be stored within the IS register 18. Therefore, the microprocessor will be started immediately upon the receipt of valid instructions in the IS register 18. There will be no need for the microprocessor computation unit to delay for an integral number of microprocessor cycles since the operation can be resumed at any C1 clock pulse of the high speed clock.

In summary, the present invention is an instruction prefetch circuit that maximizes the efficiency of a fast microprocessor and a slow asynchronous main store. The increase in speed and efficiency is achieved while maintaining the entire prefetch process transparent to the microprogrammer and the high level user. Once activated by the microinstructions, the prefetch operation is an entirely hardware controlled operation which is not dependent upon programming.

Having thus described our invention, what we claim as new, and desire to secure by Letters Patent is:

1. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination,
(a) register means for storing instruction codes retrieved from the main store, said register means connected to deliver the instruction codes therein to said computation unit,
(b) means for determining the number of main store fetch operations required to fill said register means with instruction codes retrieved from said main store, and
(c) means responsive to the decoding of selected microinstructions for initiating said determined number of main store fetch operations to fetch the next sequential instruction codes starting at said instruction code address from the main store and transferring said next sequential instruction codes into said register means.

2. Apparatus as recited in claim 1 wherein said register means comprises a first register for receiving instruction codes from the main store and a second register for receiving instruction codes from said first register for transfer to said computation unit.

3. Apparatus as recited in claim 2 including means for transferring said instruction codes from said first register into said second register when the instruction codes in said second register have been transferred for execution by said computation unit.

4. A prefetch circuit for retrieving sequentially used instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination,
(a) register means, comprising a first register for receiving instruction codes from the main store and a second register for receiving instruction codes from said first register for transfer to said computation unit,
(b) pointer means for indicating the start of the next unit of instruction codes in said second register which unit has not been transferred for execution by said computation unit,
(c) means for determining the number of main store fetch operations required to fill said register means with instruction codes retrieved from said main store, and
(d) means responsive to the decoding of selected microinstructions for initiating said determined number of main store fetch operations to fetch the next sequential instruction codes starting at said instruction code address from the main store and transferring said next sequential instruction codes into said register means.

5. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination,
(a) a first register for storing instruction codes received from said main store,
(b) a second register for storing instruction codes received from said first register, said second register connected to transfer the instruction codes therein for execution by said computation unit,
(c) means for determining the validity of the instruction codes stored in each of said registers,
(d) counter means responsive to said validity means for indicating the number of main store access operations required to fill said registers with instruction codes, and
(e) means responsive to the execution of selected microinstructions, the indication of the number of main store access operations required to fill said registers from said counter means and the instruction code address for retrieving said next following instruction codes from said main store for input into said registers, said retrieving continuing until said registers contain valid instruction codes.

6. Apparatus as recited in claim 5 including means for transferring the instruction codes in said first register into said second register when the instruction codes in said second register have been transferred for execution by the computation unit.

7. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination,
(a) a first register for storing instruction codes received from said main store,
(b) a second register for storing instruction codes received from said first register, said second register connected to transfer the instruction codes therein for execution by said computation unit,
(c) means for determining the validity of the instruction codes stored in each of said registers,
(d) counter means responsive to said validity means for indicating the number of main store access operations required to fill said registers with instruction codes,
(e) means responsive to the execution of selected microinstructions, the indication of the number of main store access operations required to fill said registers from said counter means and the instruction code address for retrieving said next following instruction codes from said main store for input into said registers, said retrieving continuing until said registers contain valid instruction codes, and (f) means for indicating the number of main store access operations which have been initiated to said main store but have not been completed.

8. A prefetch circuit for retrieving sequentially stored user instruction does from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination, (a) a first register for storing instruction codes retrieved from said main store, (b) a second register for storing instruction codes received from said first register, said second register connected to transfer the instruction codes therein for execution by said computation unit, (c) means for determining the validity of the instruction codes stored in each of said registers, (d) counter means responsive to said validity means for indicating the number of main store access operations required to fill said registers with instruction codes, (e) means responsive to the execution of selected microinstructions, the indication of the number of main store access operations required to fill said registers from said counter means and the instruction code address for retrieving said next following instruction codes from said main store for input into said registers, said retrieving continuing until said registers contain valid instruction codes, and (f) pointer means to indicate the start of a next unit of instruction codes to be transferred from said second register.

9. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination, (a) a first register for storing instruction codes received from said main store, (b) a second register for storing instruction codes received from said first register, said second register connected to transfer the instruction codes therein for execution by said computation unit, (c) means for determining the validity of the instruction codes stored in each of said registers, said means for determining including a parity check circuit to examine the instruction codes prior to transfer to said registers, a first latch for each register to indicate that the instruction code therein has not been transferred out and a second latch indicating that a branch user instruction is being processed by the computation unit, (d) counter means responsive to said validity means for indicating the number of main store access operations required to fill said registers with instruction codes, and (e) means responsive to the execution of selected microinstructions, the indication of the number of main store access operations required to fill said registers from said counter means and the instruction code address for retrieving said next following instruction codes from said main store for input into said registers, said retrieving continuing until said registers contain valid instruction codes.

10. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination, (a) a first register for storing instruction codes received from the main store, (b) a second register for storing instruction codes received from said first register, said second register connected to transfer the instruction codes therein for execution by the computation unit, (c) means responsive to the decoding of selected microinstructions for generating a fill register signal, (d) first register status means having a first state and a second state, (e) second register means having a first state and a second state, (f) means for transferring the instruction codes in said first register into said second register when the instruction codes in said second register have been transferred to the computation unit and said first register status means has a first state, (g) means for transferring instruction codes in said first register into said second register when the instruction codes in said second register are transferred to said computer while maintaining said second register status means in the first state, (h) means for setting said first register status means to the first state when said first register receives the instruction codes from the main store, (i) means for setting said first register means to the second state when the instruction codes in said first register are transferred to said second register, (j) means for setting said second register status means to the first state when said instruction codes in said first register are transferred to said second register, (k) means for setting said second register status means to the second state when said instruction codes stored in said second register are transferred to the computation unit, (l) counter means set to a first state when said first register status means and said second register status means are set to the first states, said counter means set to a second state when said first register status means is set to the second state, and (m) means for retrieving the next instruction codes from the main store at the instruction code address in the main store control and transferring the instruction codes into said first register in response to the fill register signal when said counter means is in the second state.

11. Apparatus as recited in claim 10 including pointer means for indicating the start of a next unit of instruction codes in said second register for use by the computation unit.

12. A prefetch circuit for retrieving sequentially stored user instruction codes from a main store of a digital computer prior to use by computation unit of the computer, the computer including a virtual address translator which accesses the main store by converting virtual addresses used by the computer into real addresses used by the main store and generates the virtual address for the next instruction codes to be retrieved from the main store and a control store having a collection of microinstructions which are selectively called up by user instructions and decoded for execution by the computation unit, comprising in combination, (a) a first register for storing instruction codes received from the main store, (b) a second register for storing instruction codes received from said first register, said second register connected to transfer instruction codes to the computer, (c) means for determining the number of main store fetch operations required to fill said registers with instruction codes retrieved from said main store, (d) means responsive to the decoding of selected microinstructions and the virtual address for the next instruction codes for initiating said determined number of main store fetch operations to the main store by the virtual address translator to retrieve the next instruction codes for transfer to said first register, and (e) means for transferring the instruction codes in said first register into said second register when the instruction codes in said second register have been transferred for evaluation by the computation unit.

13. A prefetch circuit for retrieving sequentially stored user instruction codes from a main store of a digital computer prior to use by a computation unit of the computer, the computer including a virtual address translator which accesses the main store by converting virtual addresses used by the computer into real addresses used by the main store and generates the virtual address for the next instruction codes to be retrieved from the main store and a control store having a collection of microinstructions which are selectively called up by user instructions and decoded for execution by the computation unit, comprising in combination, (a) a first register for storing instruction codes received from the main store, (b) a second register for storing instruction codes received from said first register, said second register connected to transfer instruction codes for execution by the computation unit, (c) means for determining the number of main store fetch operations required to fill said register with instruction codes retrieved from said main store, (d) means responsive to the decoding of selected microinstructions and the virtual address for the next instruction codes for initiating said determined number of main store fetch operations to the main store by the virtual address translator to retrieve the next instruction codes for transfer to said first register, (e) means for transferring the instruction codes in said first register into said second register when the instruction codes in said second register have been transferred for execution by the computation unit, and (f) pointer means to select the start of a next unit of instruction codes in said second register to be transferred for execution by the computation unit.

14. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computer and a virtual address translator having a conversion table stored therein for translating a selected group of virtual addresses which are used by the computation unit into real addresses which are used for accessing the main store, the virtual address translator generating the next sequential instruction code virtual address to be retrieved from the main store and generating a translation miss signal when a virtual address translation cannot be made, the main store holding a complete translation table, comprising in combination, (a) register means for receiving instruction codes from the main store and connected to transfer instruction codes in said register means to said computation unit, (b) means responsive to the translation miss signal and to the generation of a branch address signal by the computation unit in response to processing of a user branch instruction for generating a branch address transfer signal to initiate loading of said branch address into said virtual address translator, and (c) means responsive to the translation miss signal for generating a main store translation table access signal when the user instruction in said register means has been transferred to the computation unit for processing and the computation unit has not generated said branch address signal.

15. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computer, comprising in combination, (a) a first register for storing instruction codes retrieved from the main store, (b) a second register for storing instruction codes received from said first register, said second register connected to transfer instruction codes to the computation unit, (c) means responsive to the decoding of selected microinstructions for generating a fill register signal, (d) first register status means having a first state and a second state, (e) second register status means having a first state and a second state, (f) means for transferring instruction codes in said first register into said second register when said first register status means is set to the first state and said second register status means is set to the second state, (g) means for transferring instruction codes in said first register into said second register when the instruction codes in said second register are transferred to said computation unit while maintaining said second register status means in the first state, (h) means for setting said first register status means to the first state when the first register receives instruction codes from the main store, (i) means for setting said first register status means to the second state when instruction codes therein are transferred to said second register, (j) means for setting said second register status means to the first state when instruction codes in said first register are transferred to said second register, (k) means for setting said second register status means to the second state when instruction codes in said second register are transferred to the computation unit without said second register receiving instruction codes from said first register, (l) counter means having a plurality of incremental states indicating the number of retrieval operations to the main store required to fill said first and second registers, said counter means set in response to said first and second register status means, (m) means for decrementing said counter means by 1 state when said main store has received a main store access request, and (n) means responsive to said fill register signal for generating a main store access signal to access the main store at the instruction code address the number of times indicated by the state of said counter means.

16. The prefetch circuit recited in claim 15 wherein said counter means has states representing zero, one and two to indicate the number of main store access operations required to fill said first and second registers, said counter set to the zero state when both said first register status means and said second register status means are set to the first state, said counter means set to the one state when said first register status means is set to the second state and said second register status means is set to the first state, and said counter means set to said two state when both said first and said second register status means are set to said second states.

17. The prefetch circuit recited in claim 15 including means responsive to the processing of a branch user instruction for setting said first and second register status means to the second state.

18. The prefetch circuit recited in claim 15 including means for indicating the number of main store access operations which have been initiated to the main store but have not been completed.

19. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, comprising in combination, (a) register means for storing instruction codes received from the main store, said register means connected to transfer the instruction codes therein for execution by said computation unit, (b) means responsive to the decoding of selected microinstructions for retrieving instruction codes from said instruction code address in the main store and transferring the retrieved instruction codes to said register means when the instruction codes stored in said register means have been transferred for execution by said computation unit, and (c) means responsive to the processing of a branch user instruction for invalidating the instruction codes stored in said register means.

20. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computer and a main store control which generates the instruction code address for the next instruction codes to be retrieved for use by the computation unit, comprising in combination, (a) a first register for storing instruction codes received from the main store, (b) a second register for storing instruction codes received from the first register, said second register connected to transfer instruction codes to the computation unit, (c) means responsive to the decoding of selected microinstructions for generating a fill register signal, (d) means responsive to the processing of a branch user instruction for generating a branch signal, (e) first register status means having a first state and a second state, (f) second register status means having a first state and a second state, (g) means for transferring instruction codes in said first register into said second register when said first register status means is set to the first state and second register status means is set to the second state, (h) means for setting said first register status means to the first state when said first register receives the instruction codes from the main store, (i) means for setting said first register status means to the second state when instruction codes therein are transferred to said second register, (j) means for setting said first register status means to the second state in response to said branch signal, (k) means for setting said second register status means to the first state when the instruction codes in said first register are transferred to said second register, (l) means for setting said second register status means to the second state when instruction codes therein are transferred for execution by the computer unit without said second register receiving instruction codes from said first register, (m) means for setting said second register status means to the second state in response to said branch signal, (n) counter means having a plurality of incremental states indicating the number of retrieval operations to the main store required to fill said first and second registers, said counter means set in response to said first and second register status means, and (o) means for retrieving instruction codes from the main store at the instruction code address and transferring the retrieved instruction codes into said first register in response to said fill register command when said counter is set to a non zero state.

21. The prefetch circuit recited in claim 20 wherein said counter means has states representing zero, one and two to indicate the number of main store access operations required to fill said first and second registers, said counter means set to the zero state when both said first register status means and said second register status means are set to the first state, said counter means set to the one state when said first register status means is set to the second state and said second register status means is set to the first state, and said counter means set to the two state when both said first and said second register status means are set to the second states.

22. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit, a virtual address translator having a conversion table stored therein for converting a selected number of virtual addresses used by the computation unit into real addresses defining locations in said main store, said virtual address translator including an instruction address register having therein the next sequential virtual address for instruction codes to be requested from said main store, comprising in combination, (a) a control store register connected to receive said microinstructions from said control store said control store register containing a microinstruction for decoding and execution by said computation unit, (b) a first register for storing instruction codes received from the main store, (c) a second register for storing instruction codes received from said first register, said second register connected to transfer instruction codes therein for execution by said computation unit, (d) means for indicating the location of the start of a next unit of instruction code stored in said second register, said means for indicating operating as a ring counter and generating a completion signal when the means for indicating cycles to the beginning of said second register, (e) means responsive to said completion signal for transferring instruction codes in said first register into said second register, (f) means responsive to the main store for generating an instruction code ready signal when instruction codes have been retrieved from the main store for transfer to said first register, (g) means for generating a branch signal when a branch user instruction is processed by the computer, (h) means responsive to said instruction code ready signal, said completion signal and said branch signal for generating a first status signal to indicate when said first register contains valid instruction codes, (i) means responsive to said instruction code ready signal, said completion signal and said branch signal for generating a second status signal to indicate when said second register contains valid instruction codes, (j) means for generating a instruction code retrieval in progress signal when the main store is in the process of retrieving instruction codes, (k) means responsive to the decoding of predetermined microinstructions for generating a fill register signal, (l) counter means responsive to said branch signal, said first and said second status signals, said instruction code retrieval in progress signal and the status of said counter means before said fill register signal is generated for indicating the number of instruction code retrieval operations from the main store required to fill said first and said second registers, and (m) means responsive to said fill register signal and said counter means for generating an instruction code retrieval command to cause the virtual address translator to retrieve instruction codes from the main store at the location indicated by the instruction address register and transfer the retrieved instruction codes to said first register when said counter number is greater than zero.

23. The prefetch circuit recited in claim 22 including means responsive to a translation miss signal generated by the virtual address translator when a given virtual address is not included within said selected number of virtual address for calling up a predetermined microinstruction into said control store register.

24. A prefetch circuit for retrieving sequentially stored user instruction codes from a main store of a digital computer prior to use by a computation unit of the computer, the computer including a control store having a collection of microinstructions which are selectively called up by user instructions and decoded for execution by the computation unit, a main store control which generates the virtual instruction code address for the next instruction codes to be retrieved for use by the computation unit and a virtual address translator having a conversion table stored therein for translating a selected group of virtual addresses which are used by the computation unit into real addresses which are used for accessing the main store, the virtual address translator generating a request received signal when a virtual to real translation is completed, comprising in combination, (a) register means for storing instruction codes retrieved from the main store and connected to transfer instruction codes to the computation unit, (b) means responsive to the decoding of selected microinstructions for retrieving the next sequential instruction codes at said address in the main store and transferring the next instruction codes into said register means, (c) means for generating a clock signal to sequence the execution of instruction codes by the computation unit, and (d) means for terminating said clock signal when the computation unit has completed operation with the instruction codes in said register means, said register means has not received the next sequential instruction codes from the main store and said request received signal has been generated, said clock signal restarted when said register means receives the next sequential instruction codes from the main store.

25. A method for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates an address for the next instruction codes to be retrieved from the main store by incrementing the address of the last instruction codes retrieved from the main store, the method comprising the steps of, (a) producing a register input signal when a register adapted to receive instruction codes from the main store and transfer the instruction codes therein to the computation unit has capacity for storing additional instruction codes therein, (b) generating a register fill signal in response to the decoding of selected microinstructions, and (c) accessing the main store at said address for the next instruction codes in response to said register input signal and said register fill signal to retrieve instruction codes and transfer the retrieved instruction codes to said register.

26. A method for retrieving sequentially stored user instruction codes from a main store of a digital computer prior to use by a computation unit of the computer, the computer including a control store having a collection of microinstructions which are selectively called up by user instructions and decoded for execution by the computation unit and a main store control which generates the instruction code address for the next instruction codes to be retrieved for use by the computation unit, the method comprising the steps of:

(a) producing a register input signal when a register means adapted to receive instruction codes from the main store and transfer instruction codes to said computation unit has capacity for storing additional instruction codes therein, (b) generating a register fill signal in response to the decoding of selected microinstructions, (c) accessing the main store at the instruction code address in response to said register input signal and said register fill signal to retrieve the instruction codes therein and transfer the retrieved instruction codes to said register means, (d) producing a branch address signal when a branch user instruction is processed by the computation unit, and (e) invalidating the instruction codes which are stored in said register means in response to said branch address signal by setting a validity latch to an invalid state.

27. A method for retrieving sequentially stored user instruction codes from a main store of a digital computer through a virtual address translator prior to use by a computation unit of the computer, the virtual address translator transforming virtual addresses to real addresses and including an address register wherein the virtual address translator maintains the virtual aaddress for the next instruction codes following the last instruction codes requested for retrieval through said virtual address translator and generating a request received signal when a virtual to real translation is completed, the computer including a control store having a collection of microinstructions which are selectively called up by user instructions and decoded for execution by the computation unit, the method comprising the steps of:

(a) generating a fill register signal in response to decoding of selected microinstructions, (b) generating a data ready signal when the main store has retrieved instruction codes requested through the virtual address translator, (c) generating a first status signal having first and second states to reflect the status of the contents of a first register, (d) generating a second status signal having first and second states to reflect the status of the contents of a second register, (e) transferring the contents of said first register to said second register when said first status signal has the first state and said second status signal has the second state, (f) transferring the contents of said first register to said second register when the contents of said second register are transferred to said computation unit while maintaining said second status signal set to the first state, (g) setting said first status signal to the first state when instruction codes are transferred from the main store into said first register, (h) setting said first status signal to the second state when the contents of said first register are transferred to said second register, (i) setting said second status signal to the first state when the contents of said first register are transferred to said second register, (j) setting said second status signal to the second state when the contents of said second register are transferred to the computation unit without said second register receiving the contents of said first register, (k) setting a counter in response to said request received signal, said first status signal, said second status signal and the status of said counter means before said fill register signal is generated to indicate the number of instruction code retrieval operations from the main store required to fill said first register and said second register, and (l) generating instruction code retrieval operations through the virtual address translator to the main store at the virtual address stored in said address register in response to said fill register signal to transfer instruction codes from the main store to said first register, said operations continuing until said counter indicates that no further operations are required to fill said registers.

28. The method as recited in claim 27 including the step of:

setting said first status signal to the second state and setting said second status signal to the second state in response to the processing of a branch user instruction by the computation unit.

29. The method recited in claim 27 including the steps of, (a) generating a data invalid signal when the computation unit requests instruction codes from said second register and said second status signal is set to the second state, and (b) suspending the operation of said computation unit in response to said data invalid signal when the virtual address has transformed a given virtual address into a real address and has generated said request received signal.

* * * * *

UNITED STATES PATENT AND TRADEMARK OFFICE
CERTIFICATE OF CORRECTION

PATENT NO. : 4,298,927

DATED : November 3, 1981

INVENTOR(S) : Neil C. Berglund, William G. Kempke, William C. Richardson

It is certified that error appears in the above—identified patent and that said Letters Patent is hereby corrected as shown below:

Column 29, line 48, change "used" to --user--.

Column 31, line 7, change "does" to --codes--.

Column 37, line 43, change "a" to --an--.

Signed and Sealed this

Fifth Day of July 1983

[SEAL]

Attest:

Attesting Officer

GERALD J. MOSSINGHOFF

Commissioner of Patents and Trademarks